(12) United States Patent
Sawafta et al.

(10) Patent No.: US 12,320,583 B2
(45) Date of Patent: Jun. 3, 2025

(54) SYSTEMS FOR STORING AND/OR TRANSPORTING TEMPERATURE-SENSITIVE PAYLOADS

(71) Applicant: Phase Change Energy Solutions, Inc., Greensboro, NC (US)

(72) Inventors: Reyad I. Sawafta, Greensboro, NC (US); Venu Gopal R. Kuturu, Greensboro, NC (US); Brian Steven Chapman, Greensboro, NC (US)

(73) Assignee: Phase Change Energy Solutions, Inc., Greensboro, NC (US)

( * ) Notice: Subject to any disclaimer, the term of this patent is extended or adjusted under 35 U.S.C. 154(b) by 86 days.

(21) Appl. No.: 18/035,944

(22) PCT Filed: Nov. 15, 2021

(86) PCT No.: PCT/US2021/059346
§ 371 (c)(1),
(2) Date: May 9, 2023

(87) PCT Pub. No.: WO2022/104189
PCT Pub. Date: May 19, 2022

(65) Prior Publication Data
US 2023/0408162 A1 Dec. 21, 2023

Related U.S. Application Data

(60) Provisional application No. 63/126,093, filed on Dec. 16, 2020, provisional application No. 63/113,903, filed on Nov. 15, 2020.

(51) Int. Cl.
*F25D 3/08* (2006.01)

(52) U.S. Cl.
CPC ........ *F25D 3/08* (2013.01); *F25D 2303/0843* (2013.01); *F25D 2303/085* (2013.01)

(58) Field of Classification Search
CPC .............. F25D 3/08; F25D 2303/0843; F25D 2303/085
(Continued)

(56) References Cited

U.S. PATENT DOCUMENTS

2011/0147391 A1\* 6/2011 Corder ............... B65D 77/0413
220/592.27
2011/0290792 A1 12/2011 Krzak
(Continued)

FOREIGN PATENT DOCUMENTS

CA 3099633 A1 \* 12/2019 ............. B65D 81/18
CN 204085013 U 1/2015
(Continued)

*Primary Examiner* — J. Gregory Pickett
*Assistant Examiner* — Niki M Eloshway
(74) *Attorney, Agent, or Firm* — John P. Zimmer; Maynard Nexsen PC

(57) ABSTRACT

In one aspect, systems for storing and/or transporting a payload are described herein. In some embodiments, systems have a portable storage vessel having an internal cavity, the internal cavity having: a central zone for receiving the payload; a first cooling zone disposed radially outward from the central recess, with a first phase change material disposed in the first cooling zone; a second cooling zone disposed radially outward from the first cooling zone, with a second phase change material disposed in the second cooling zone, wherein the first phase change material has a first phase transition temperature; wherein the second phase change material has a second phase transition temperature; and wherein the second phase transition temperature is between 10° C. and 15° C. higher than the first phase transition temperature; and wherein each of the first phase transition temperature and the second phase transition temperature are below 0° C.

18 Claims, 13 Drawing Sheets

(58) Field of Classification Search
USPC .................................................. 220/592.01
See application file for complete search history.

(56) References Cited

U.S. PATENT DOCUMENTS

| | | |
|---|---|---|
| 2012/0248101 A1 | 10/2012 | Tumber et al. |
| 2014/0190976 A1 | 7/2014 | Imbrecht |
| 2017/0108260 A1 | 4/2017 | Ansted et al. |
| 2018/0320947 A1 | 11/2018 | Jain |
| 2018/0353379 A1 | 12/2018 | Chou et al. |
| 2019/0359411 A1 | 11/2019 | Fallgren |
| 2020/0408453 A1* | 12/2020 | Martino ............. B65D 81/3858 |
| 2024/0271849 A1* | 8/2024 | Yang ...................... B65D 81/38 |

FOREIGN PATENT DOCUMENTS

| | | | | |
|---|---|---|---|---|
| GB | 2580708 A | * | 7/2020 | ............. B65D 25/04 |
| GB | 2586194 A | * | 2/2021 | ............. B65D 81/38 |
| JP | H0968376 A | | 3/1997 | |
| WO | 2012081581 A1 | | 6/2012 | |
| WO | 2016162451 A1 | | 10/2016 | |
| WO | 2016194745 A1 | | 12/2016 | |
| WO | WO-2017072638 A1 | * | 5/2017 | ......... B65D 81/3825 |
| WO | WO-2017220953 A1 | * | 12/2017 | ............. B65B 55/00 |
| WO | WO-2019162451 A1 | * | 8/2019 | ............. F42B 12/06 |

* cited by examiner

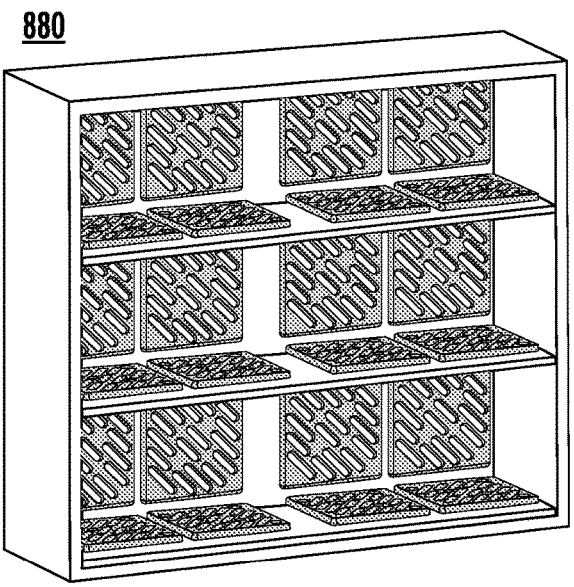
2-8°C  FIG. 8A
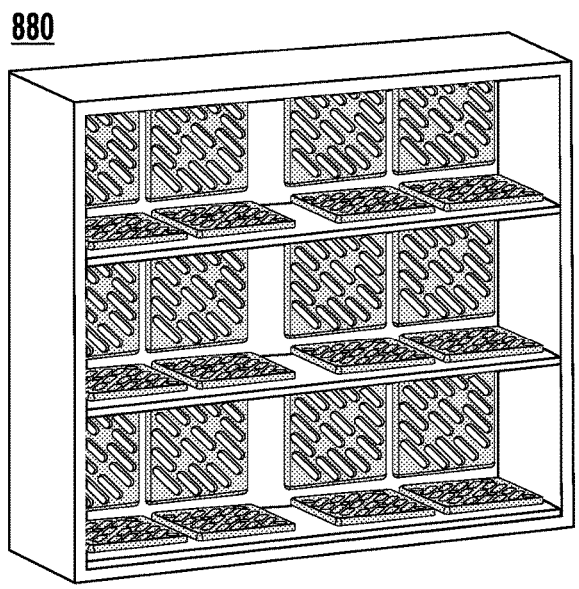
-20°C  FIG. 8B
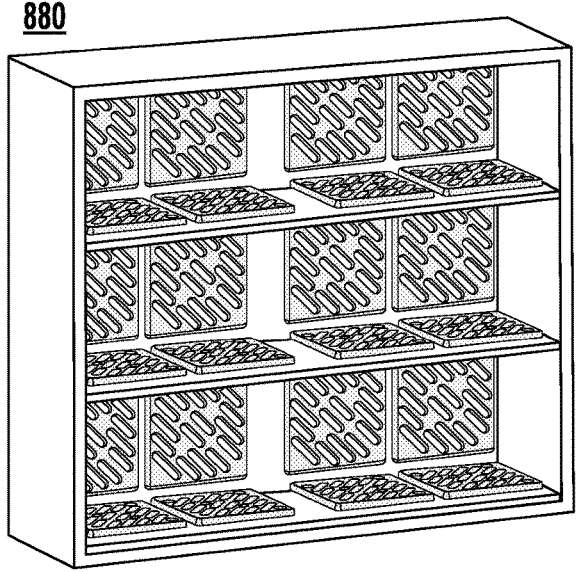
-50°C  FIG. 8C
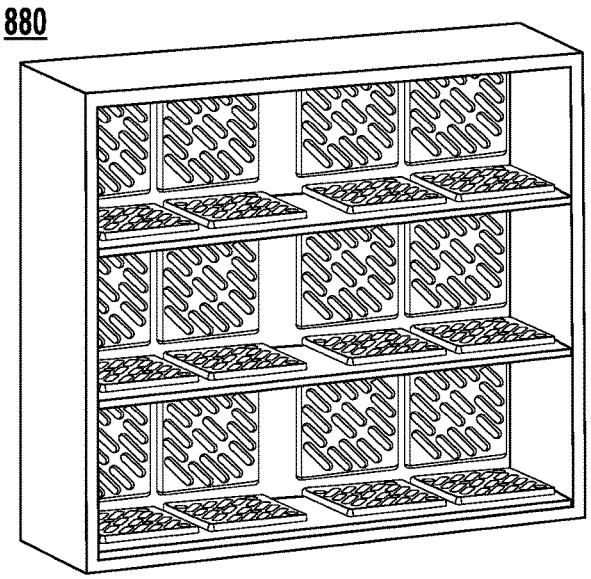
-70°C  FIG. 8D

SYSTEMS FOR STORING AND/OR TRANSPORTING TEMPERATURE-SENSITIVE PAYLOADS

RELATED APPLICATIONS

This application is a 35 U.S.C. § 371 U.S. national phase entry of International Application No. PCT/US2021/059346 having an international filing date of Nov. 15, 2021, which is related and claims priority to U.S. Provisional Patent Application No. 63/113,903 filed Nov. 15, 2020, and U.S. Provisional Patent Application Ser. No. 63/126,093 filed Dec. 16, 2020, the entirety of which are herein incorporated by reference.

FIELD

The present disclosure relates to systems for storing and/or transporting a payload, and to methods of transporting a payload using such systems.

BACKGROUND

Logistics surrounding temperature-sensitive payloads are often a limiting factor in determining maximum inventory and viability of shipping goods which must maintain temperature extremes such as higher than ambient temperatures, as in the case of hot foods, or lower than ambient temperatures such as items which require refrigeration or freezing. However, some previous systems for storing and/or transporting a payload, in particular a temperature-sensitive payload, suffer from one or more disadvantages, such as short maximum storage or transit times, limited temperature ranges for storage and/or transit, poor emissions or environmental conditions associated with storage or transit, and/or high cost to maintain or replace such systems. Further, certain prior systems require partial or total replacement after a single use. Improved systems for storing and/or transporting temperature-sensitive payloads are therefore desired.

SUMMARY

In one aspect, systems for storing and/or transporting payloads are described herein. Such systems, in some cases, can provide one or more advantages compared to some existing systems. In some embodiments, for example, a system described herein can permit storage or transport of a payload at a wider variety of temperatures. A system described herein, in some cases, can provide longer storage or transport times, particularly at temperatures below 0° C. than prior systems. Additionally, in some instances, systems described herein may provide lower cost to operate than certain disposable or single-use systems.

Systems described herein can be used for storage and/or transport of a variety of payloads, particularly temperature-sensitive payloads including, but not limited to food and beverages, pharmaceuticals, vaccines, biological material, medical devices, and/or diagnostic kits or components thereof. In some embodiments, systems described herein can be used for payloads requiring lower storage and/or transport temperatures. Additionally, and/or alternatively, systems described herein may be used for longer storage and/or transport times without the use of active refrigeration or freezing by a chiller unit (such as a commercial freezer) than certain prior solutions. Moreover, systems described herein may provide one or more utilities with lesser or no gaseous emissions. Systems for storing and/or transporting a payload described herein may be used advantageously for other purposes also, as described further herein.

In some embodiments, a system for storing and/or transporting a payload described herein comprises a portable storage vessel having an internal cavity. The internal cavity has a central zone for receiving the payload, a first cooling zone disposed radially outward from the central recess, with a first phase change material disposed in the first cooling zone, and a second cooling zone disposed radially outward from the first cooling zone, with a second phase change material disposed in the second cooling zone. The first phase change material has a first phase transition temperature, and the second phase change material has a second phase transition temperature. The second phase transition temperature is between 10° C. and 15° C. higher than the first phase transition temperature, and each of the first phase transition temperature and the second phase transition temperature are below 0° C.

Such systems optionally include a third cooling zone disposed radially outward from the second cooling zone, with a third phase change material disposed in the third cooling zone. The third phase change material has a third phase transition temperature, which can be between 10° C. and 15° C. higher than the second phase transition temperature. In certain embodiments, the third phase change material is dispersed in a foam, such as a polyurethane foam, a polyester foam, or a polystyrene foam.

Additionally, such systems may optionally include an outer storage vessel having at least one recess configured to receive the portable storage vessel. In some instances, the outer storage vessel may comprise an insulating material. In certain embodiments, the outer storage vessel contains at least one phase change material, which may optionally have a phase transition temperature at least 10° C. higher than a highest phase transition temperature of a phase change material disposed in the portable storage vessel. In certain other embodiments, the outer storage vessel contains at least one phase change material having the same or substantially the same phase transition temperature as a highest phase transition temperature of a phase change material disposed in the portable storage vessel. Further, in some embodiments, the outer storage vessel contains at least two phase change materials having different phase transition temperatures.

In certain other embodiments, a system for storing and/or transporting a payload described herein comprises a portable storage vessel having a plurality of interior recesses. The plurality of interior recesses comprise a central recess for receiving the payload, a number $n_1$, of first cooling zone recesses radially outward from the central recess, and a number, $n_2$, of second cooling zone recesses radially outward from the plurality of first cooling zone recesses. The system further comprises a number, $n_3$, of first thermal storage cells, individual first thermal storage cells comprising a container having an interior volume and a first phase change material disposed in the interior volume, with individual first thermal storage cells being disposed in the first cooling zone recesses, and a number, $n_4$, of second thermal storage cells, individual second thermal storage cells comprising a container having an interior volume and a second phase change material disposed in the interior volume, with individual second thermal storage cells being disposed in the second cooling zone recesses. The first phase change material has a first phase transition temperature and the second phase change material has a second phase transition temperature. The second phase transition temperature is between 10° C. and 15° C. higher than the first phase transition temperature, and each of the first phase transition temperature and the second phase transition temperature are below 0° C.

Such systems optionally include a third phase change material. The third phase change material has a third phase transition temperature, which can be between 10° C. and 15° C. higher than the second phase transition temperature. In certain embodiments, the third phase change material is dispersed in a foam, such as a polyurethane foam, a polyester foam, or a polystyrene foam.

Additionally, such systems may optionally include an outer storage vessel having at least one recess configured to receive the portable storage vessel. In some instances, the outer storage vessel may comprise an insulating material. In certain embodiments, the outer storage vessel contains at least one phase change material, which may optionally have a phase transition temperature at least 10° C. higher than a highest phase transition temperature of a phase change material disposed in the portable storage vessel. In certain other embodiments, the outer storage vessel contains at least one phase change material having the same or substantially the same phase transition temperature as a highest phase transition temperature of a phase change material disposed in the portable storage vessel. Further, in some embodiments, the outer storage vessel contains at least two phase change materials having different phase transition temperatures.

In another aspect, methods of storing or transporting a payload are described herein. Methods described herein may comprise disposing the payload in the central zone or central recess of a system described herein. Methods described herein may further comprise changing the phase of one or more of the phase change materials from a first phase to a second phase These and other implementations are described in more detail in the detailed description which follows.

BRIEF DESCRIPTION OF THE DRAWINGS

FIG. 8A is a perspective view of an example embodiment with a desired temperature range 2-8° C.
FIG. 8B is a perspective view of an example embodiment with a desired temperature range −20° C.
FIG. 8C is a perspective view of an example embodiment with a desired temperature range −50° C.
FIG. 8D is a perspective view of an example embodiment with a desired temperature range −70° C.

DETAILED DESCRIPTION

Implementations and embodiments described herein can be understood more readily by reference to the following detailed description, examples, and drawings. Elements, apparatus, and methods described herein, however, are not limited to the specific implementations presented in the detailed description, examples, and drawings. It should be recognized that these implementations are merely illustrative of the principles of the present disclosure. Numerous modifications and adaptations will be readily apparent to those of skill in the art without departing from the spirit and scope of the disclosure.

In addition, all ranges disclosed herein are to be understood to encompass any and all subranges subsumed therein. For example, a stated range of "1.0 to 10.0" should be considered to include any and all subranges beginning with a minimum of 1.0 or more and ending with a maximum value of 10.0 or less, e.g., 1.0 to 5.3, or 4.7 to 10.0, or 3.6 to 7.9. Similarly, as will be clearly understood, a stated range of "1 to 10" should be considered to include any and all subranges beginning with a minimum of 1 or more and ending with a maximum value of 10 or less, e.g., 1 to 6, or 7 to 10, or 3.6 to 7.9.

All ranges disclosed herein are also to be considered to include the end points of the range, unless expressly stated otherwise. For example, a range of "between 5 and 10," "from 5 to 10," or "5-10" should generally be considered to include the end points of 5 and 10.

I. Systems

Figure 1A:
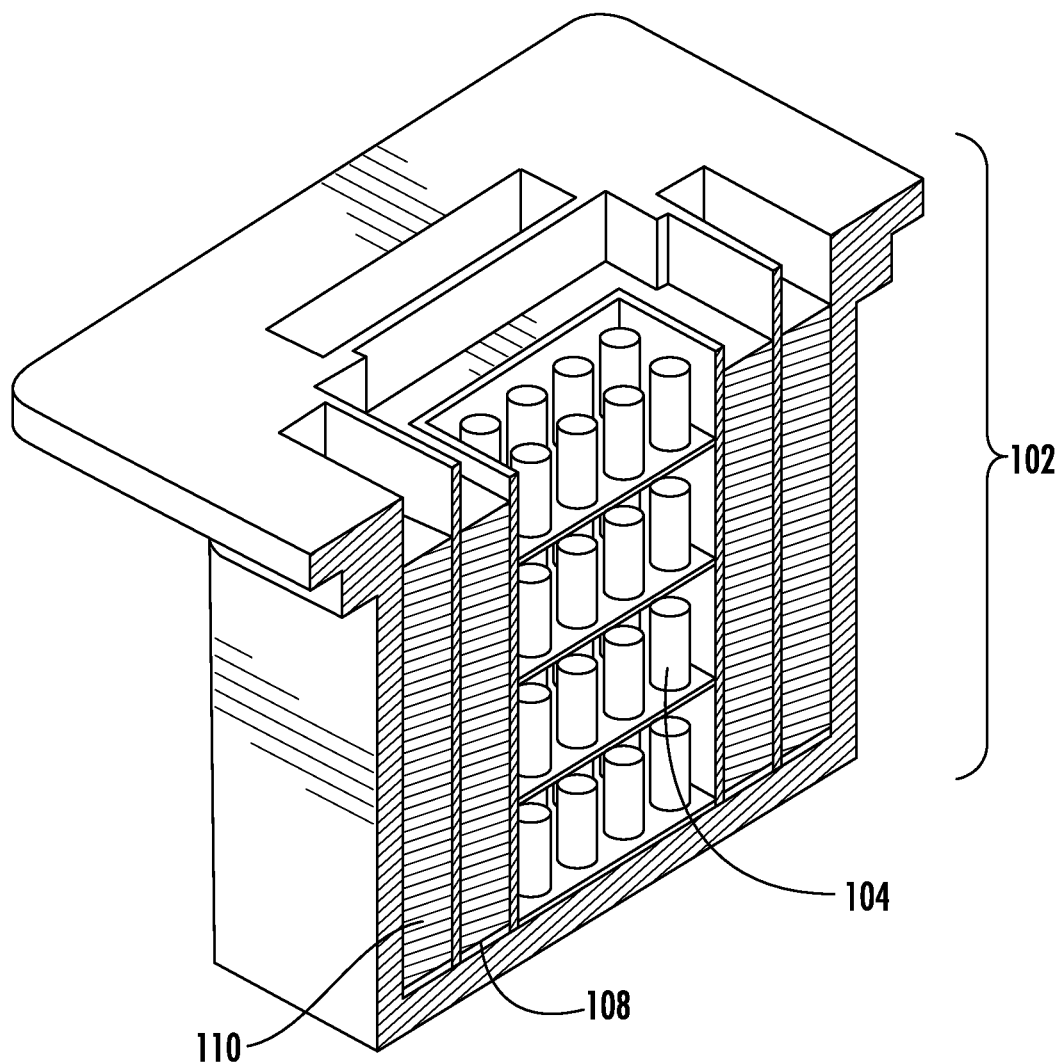
FIG. 1A is a perspective view of an illustration of an example embodiment of a portable vessel system.
Figure 1B:
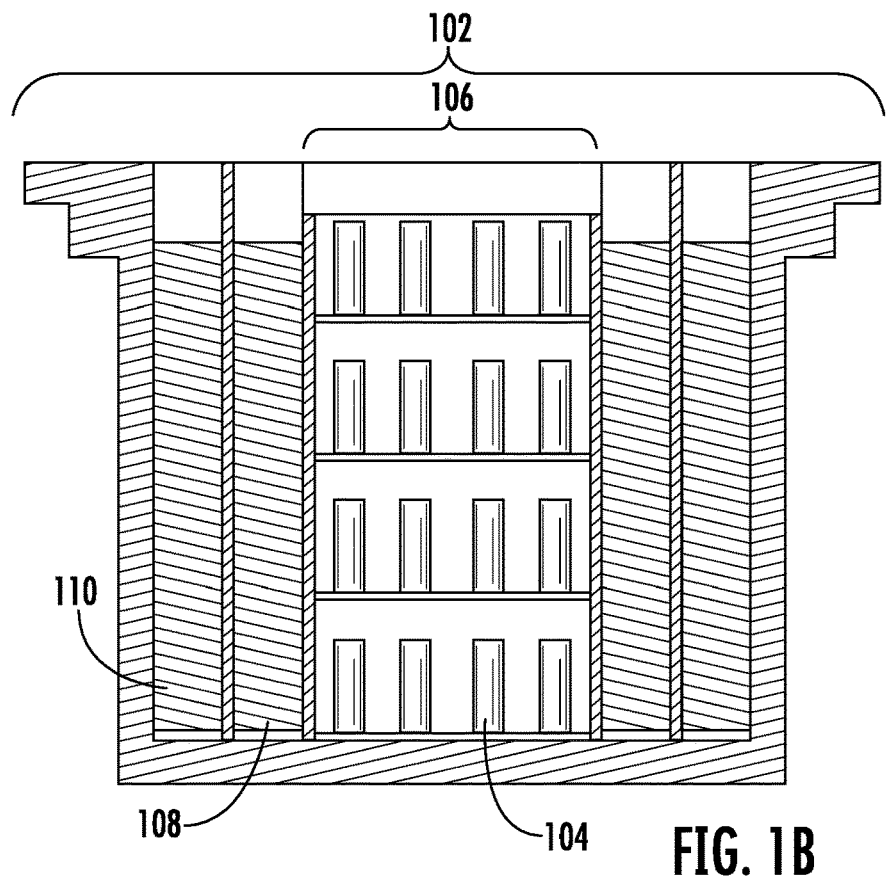
FIG. 1B is a cross section view of an illustration of an example embodiment of a portable vessel system.
Figure 1C:
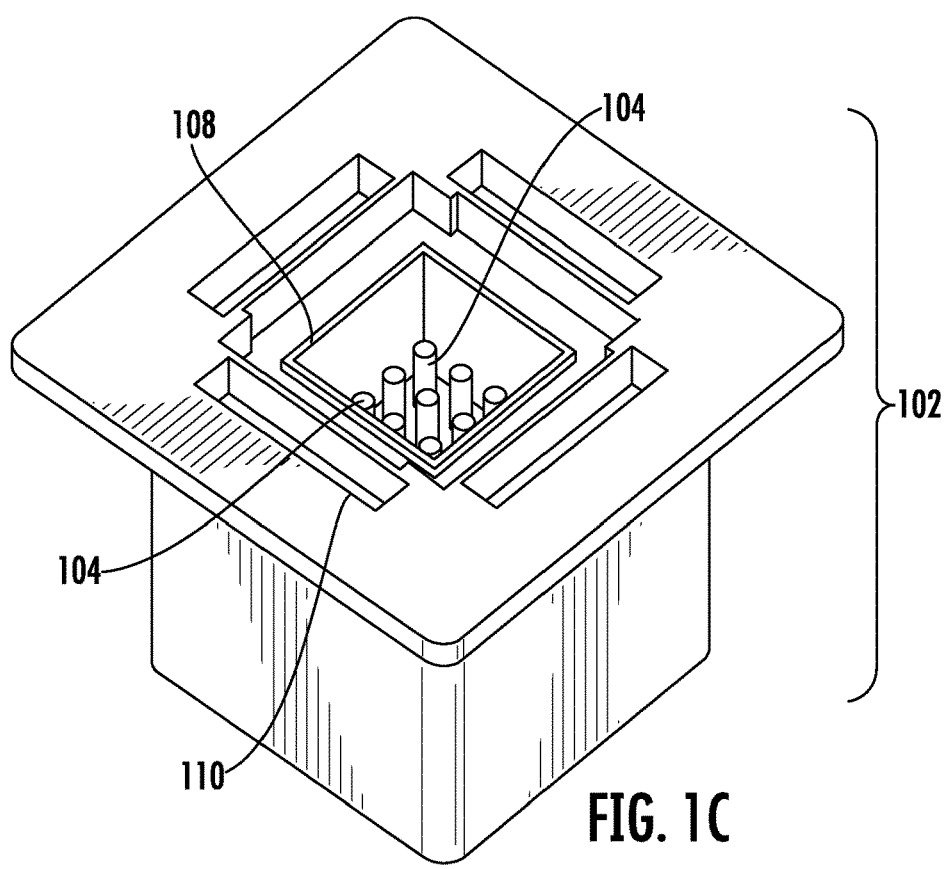
FIG. 1C is a top perspective view of an illustration of an example embodiment of a portable vessel system.

Referring now to FIG. 1A-C, in one aspect, systems for storing and/or transporting payloads are described herein. In some embodiments, a system for storing and/or transporting a payload described herein comprises a portable storage vessel 102 having an internal cavity. The internal cavity has a central zone 106 for receiving the payload, a first cooling zone 108 disposed radially outward from the central recess, with a first phase change material disposed in the first cooling zone 108, and a second cooling zone 110 disposed radially outward from the first cooling zone 108, with a second phase change material disposed in the second cooling zone 110. The first phase change material has a first phase transition temperature, and the second phase change material has a second phase transition temperature. The second phase transition temperature is between 10° C. and 15° C. higher than the first phase transition temperature, and each of the first phase transition temperature and the second phase transition temperature are below 0° C. Portable storage vessels 102 can further comprise or include components or structures adapted to thermally "seal" or close the vessel to prevent or limited thermal energy exchange between an interior volume of the vessel and an external environment. Such structure may comprise or include a lid or cap.

As referenced herein, "portable" indicates that a storage vessel is able to be carried or moved, as without the aid of heavy machinery such as a forklift. In some embodiments, a portable storage vessel 102 containing the payload in addition to at least two phase change materials ("PCMs") may weigh less than 150 lbs., such as less than 100 lbs., less than 75 lbs., or less than 50 lbs. In certain embodiments, a portable storage vessel may be moved with the aid of light equipment, such as a dolly, hand truck, sack barrow, or hand cart. Such systems may permit stacking of multiple portable storage vessels 102.

Interior volumes of portable storage vessels 102 described herein may define or include at least a central zone 106 or region, a first cooling zone 108 (optionally comprising one or more first cooling zone recesses) radially outward from the central zone 106, and a second cooling zone (optionally comprising one or more second cooling zone recesses) radially outward from the first cooling zone. A cooling zone, in some embodiments, is defined by internal structure within the portable storage container, as in the case of the presence of one or more cooling zone recesses. However, in certain other embodiments, cooling zones are defined by an amount of PCM and/or thermally insulating disposed within the container. In this manner, cooling zones may be optionally adapted to the needs of the particular payload and its degree of temperature sensitivity. For example, a portable storage vessel 102 has a first cooling zone 108 which is 50-67% of the volume of the container for one use, but which is adapted to be 25-33% of the volume of the container for another use. In certain other embodiments, the relative volumes of the cooling zones are fixed.

In some embodiments, an amount of each PCM disposed in respective zones is determined based upon a desired total thermal capacity of each zone. For example, if a given cooling zone comprises a PCM having a lower phase change enthalpy or latent heat, a larger volume or mass of the PCM may be used relative to another cooling zone having a lower volume or mass of PCM due to a correspondingly higher phase change enthalpy or latent heat. Additionally, in some embodiments, this determination may further include the specific heat of the material in addition to the phase change enthalpy and/or a sensible heat of the material over a specific range of temperatures.

Figure 9A:
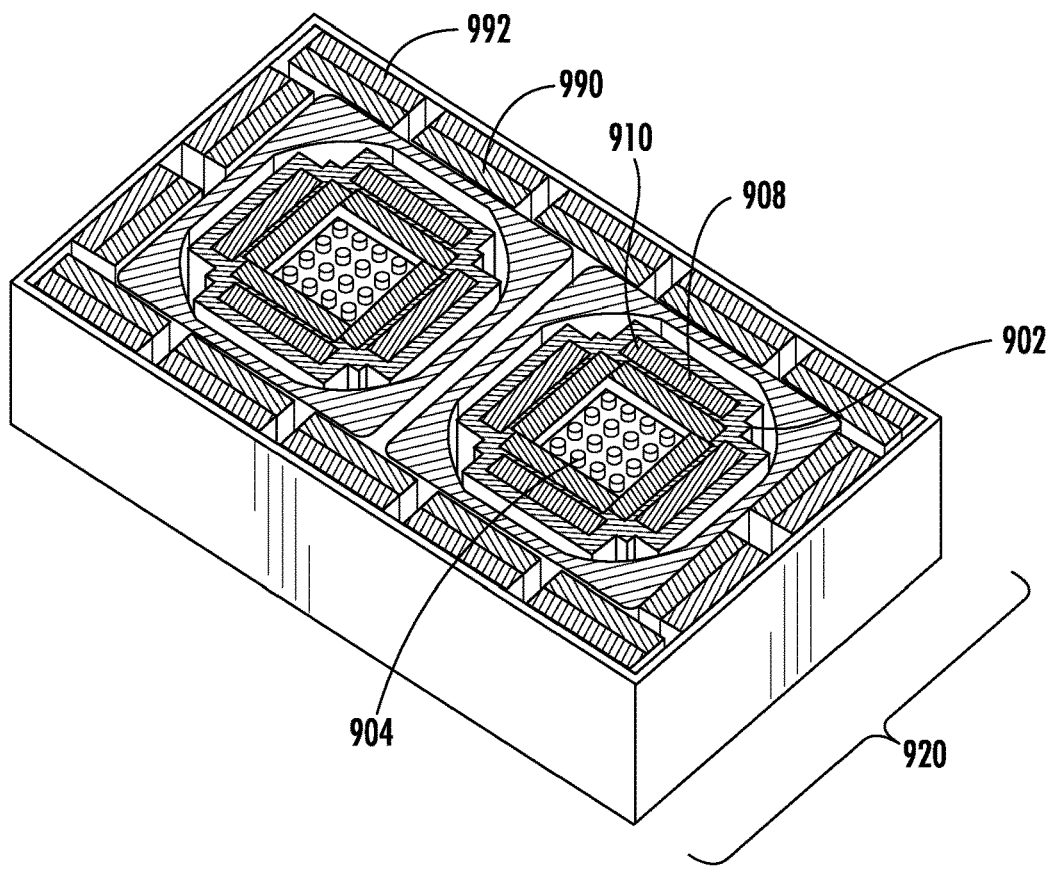
FIG. 9A is a perspective view of an example embodiment of a plurality of portable storage vessels within an outer storage vessel.

Further, in some instances, a portable storage vessel 102 may comprise or include a number of recesses which are usable for a central recess, a set or number of first cooling zone recesses 108, and a second set or number of second cooling zone recesses 210, and may optionally include third or further cooling zone recesses (See FIG. 9A). In some such embodiments, a thermal storage cell containing a first phase change material may be disposed in all first cooling zone recesses. However, it may be desirable to reduce the number of thermal storage cells disposed in the first cooling zone 108 where a shorter storage period or transit time is required and/or when the payload is less temperature sensitive, or is required at a higher temperature relative to certain other payloads. Portable storage vessels 102 consistent with these configurations may be considered "modular." In certain embodiments, it may be desirable to allow for reduced PCM of one or more cooling zones in order to reduce energy usage or freezer storage capacity for "charging" PCMs to only the amount necessary for the desired storage period or transit time. This may be especially preferred where one or more PCMs must be "charged" in an ultra-low temperature freezer, which may incur large expense or may have limited capacity for charging the PCM or PCMs while storing material to be used as the payload(s).

Figure 2A:
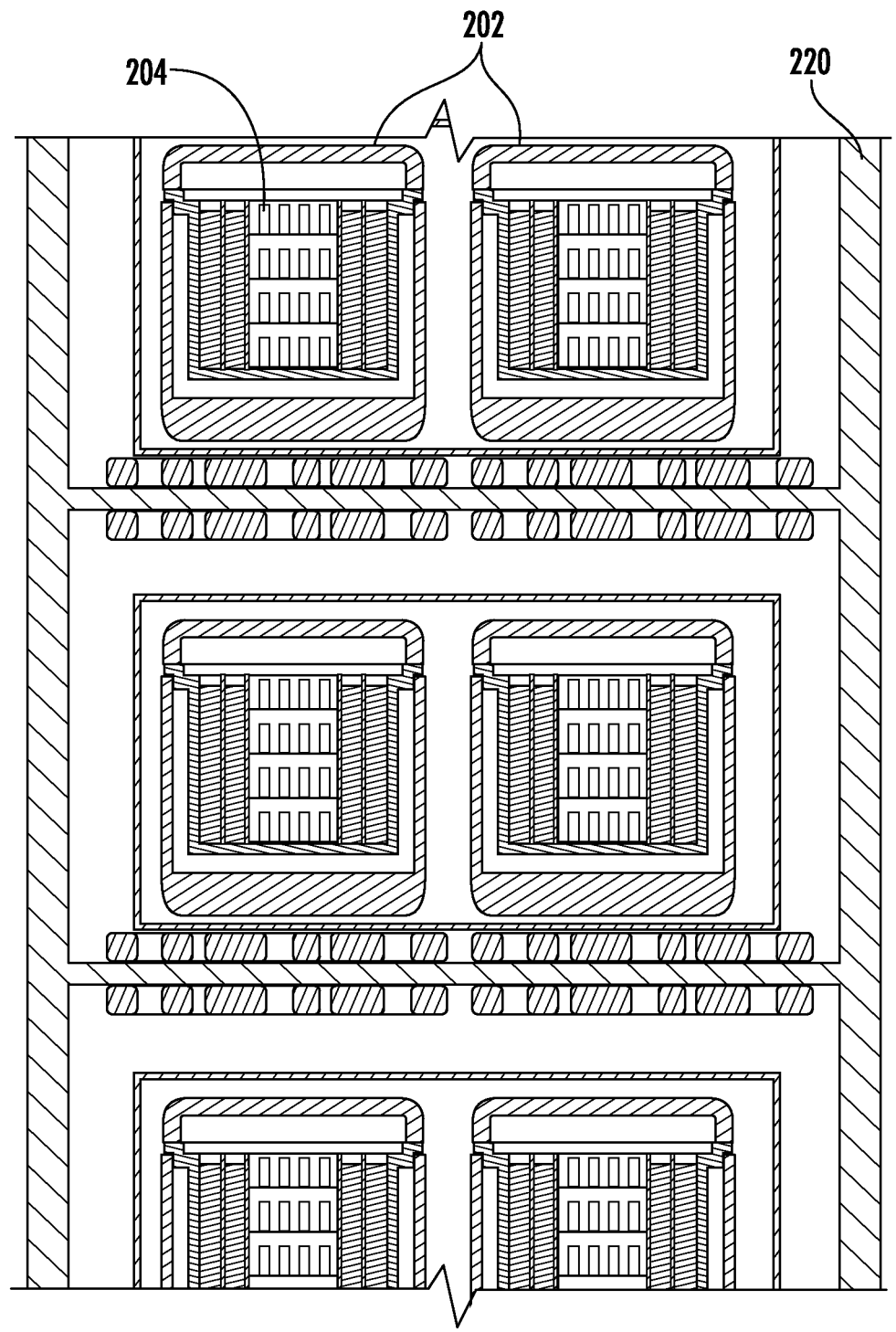
FIG. 2A is a cross-section view of an illustration of an example embodiment of a vessel system.
Figure 2B:
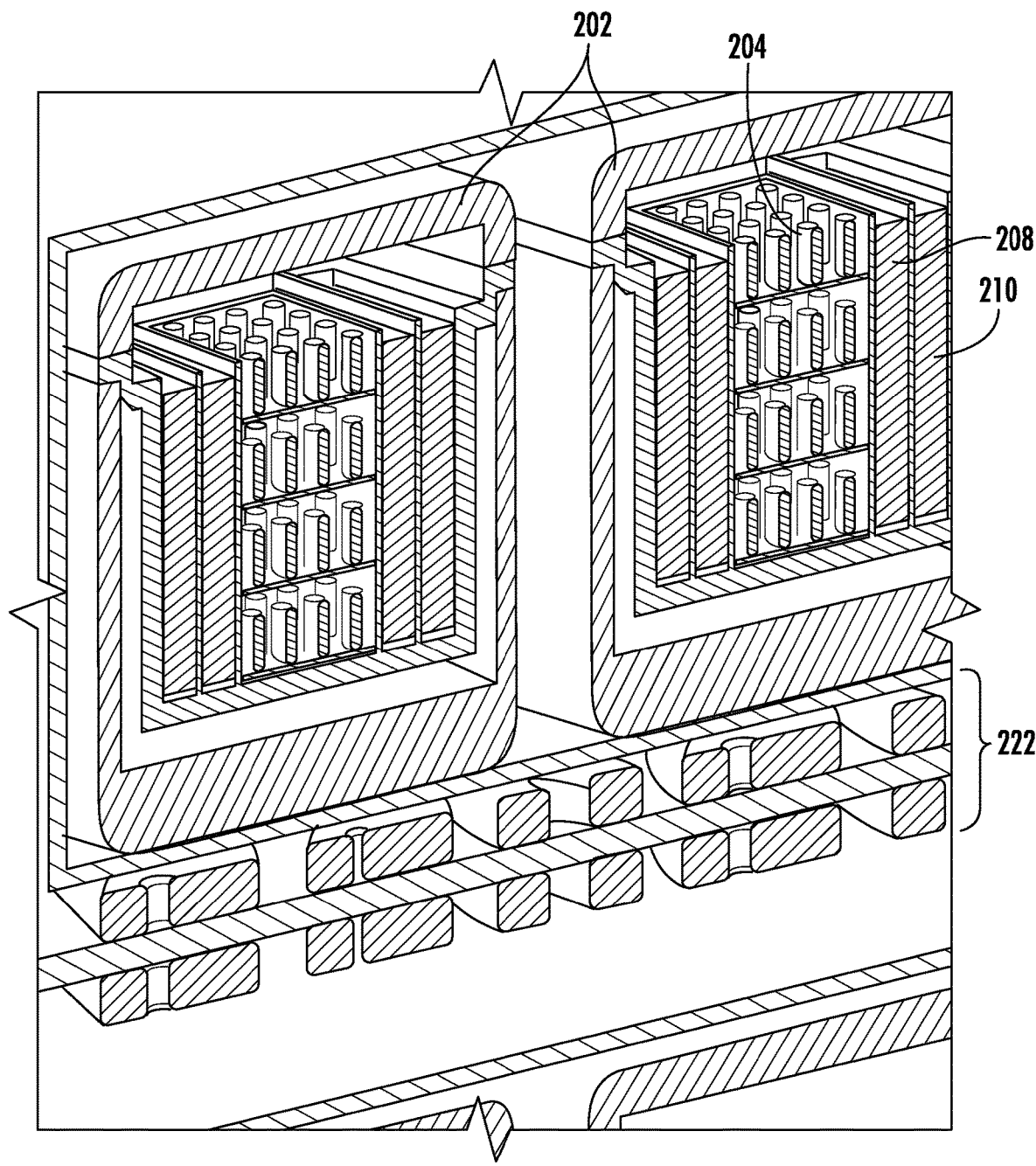
FIG. 2B is a zoomed in view of a cross-section view of an illustration of an example embodiment of a vessel system.

Referring now to FIGS. 2A-B, a cross-section view and a zoomed in cross-section view of an illustration of an example embodiment of a vessel system. Not intending to be bound by theory, "nested" zones of PCMs in which successive cooling zones are disposed radially outward from one another can provide greater thermal storage capacity and/or increased temperature resilience for a payload disposed in a central zone or recess. For example, a first cooling zone 208 may be located near the payload 204, and then subsequently followed by a second cooling zone 210, and a third, a fourth, or any number of cooling zones to accomplish the cooling needs of the payload 204. Further, adjacent PCMs can "charge" one another based on the selected phase transition temperatures and latent heats of the materials. For example, an outermost layer of PCM may absorb thermal energy from an environment external to the portable storage container, and a layer of PCM disposed radially inward may absorb some or all of this thermal energy, thus "charging" or "recharging" the outer material. Again not intending to be bound by theory, nested PCM systems described herein can permit thermal energy resiliency for one another and can provide improved thermal resiliency for a payload disposed in such a system.

Figure 3A:
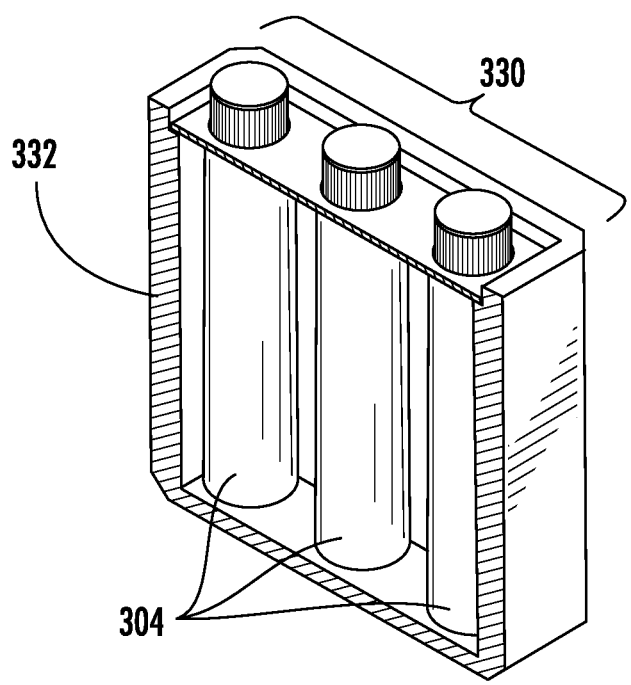
FIG. 3A is a perspective view of an example embodiment of a payload container.
Figure 3B:
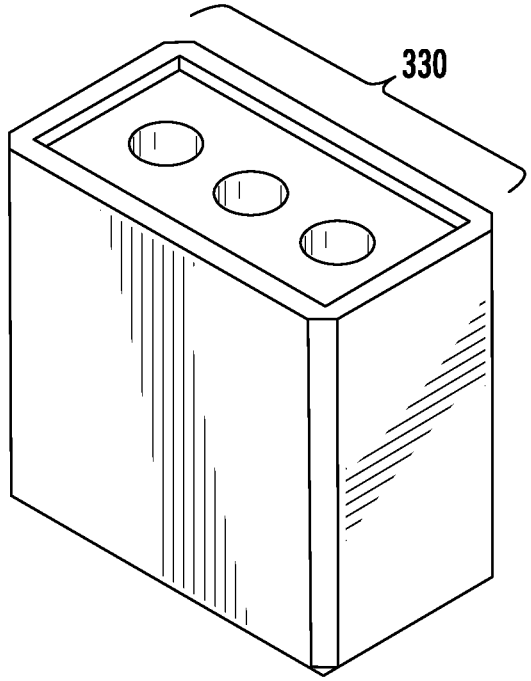
FIG. 3B is an additional perspective view of an example embodiment of a payload container.
Figure 3C:
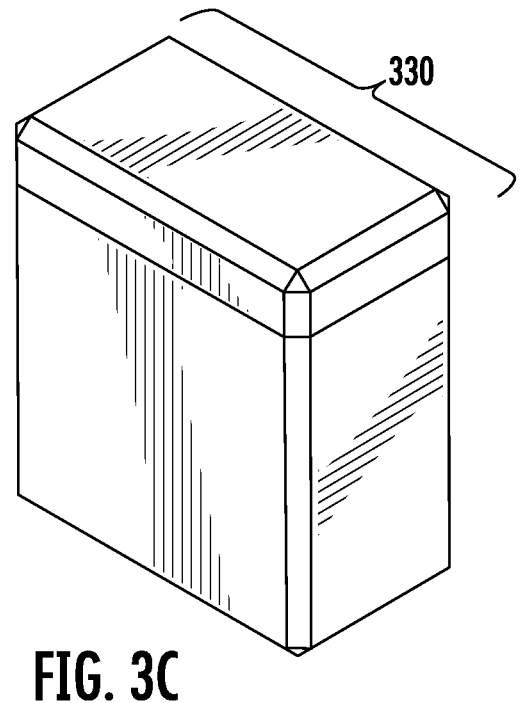
FIG. 3C is an additional perspective view of an example embodiment of a payload container.
Figure 4A:
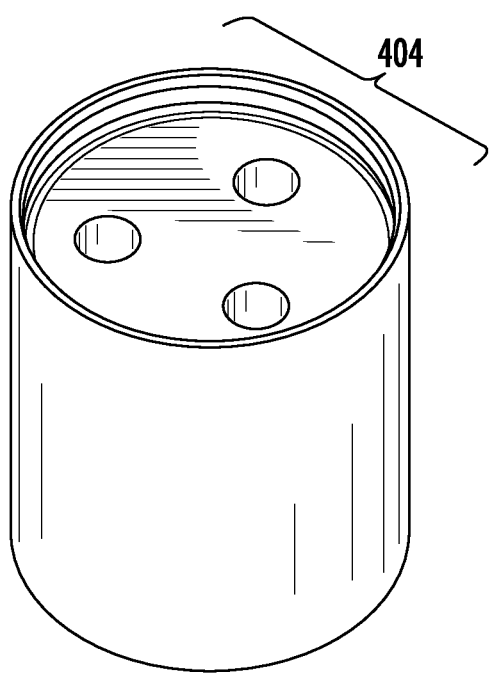
FIG. 4A is a perspective view of an example embodiment of a payload container.
Figure 4B:
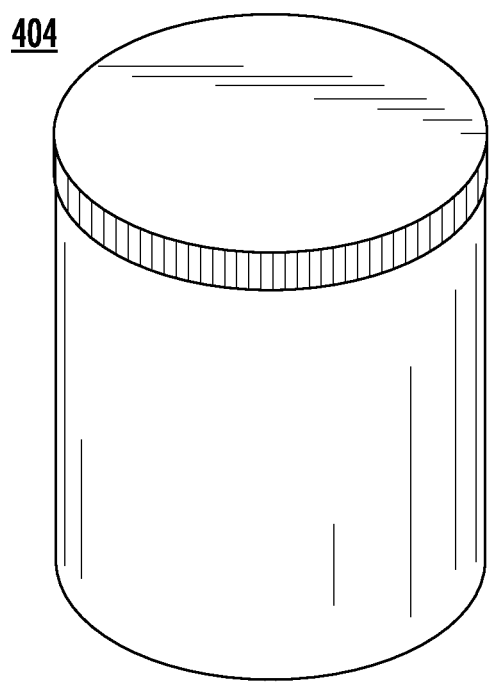
FIG. 4B is an additional perspective view of an example embodiment of a payload container.
Figure 4C:
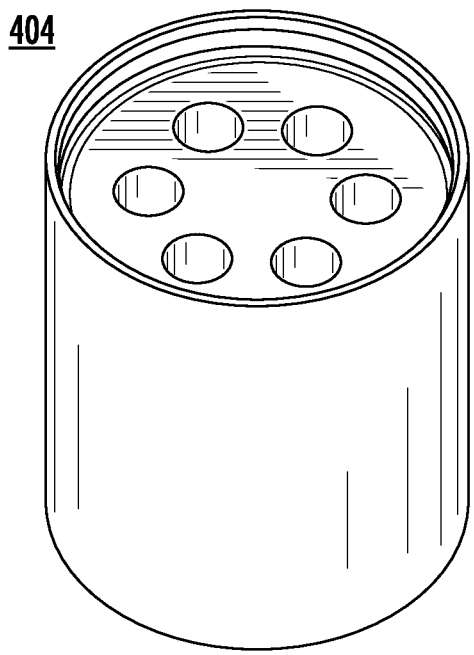
FIG. 4C is an additional perspective view of an example embodiment of a payload container.
Figure 4D:
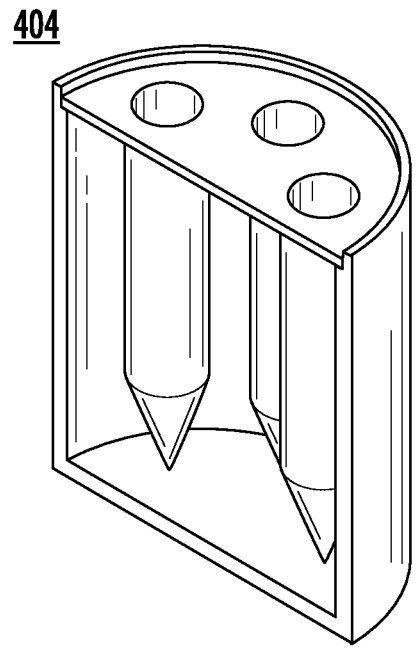
FIG. 4D is an additional perspective view of an example embodiment of a payload container.
Figure 5A:
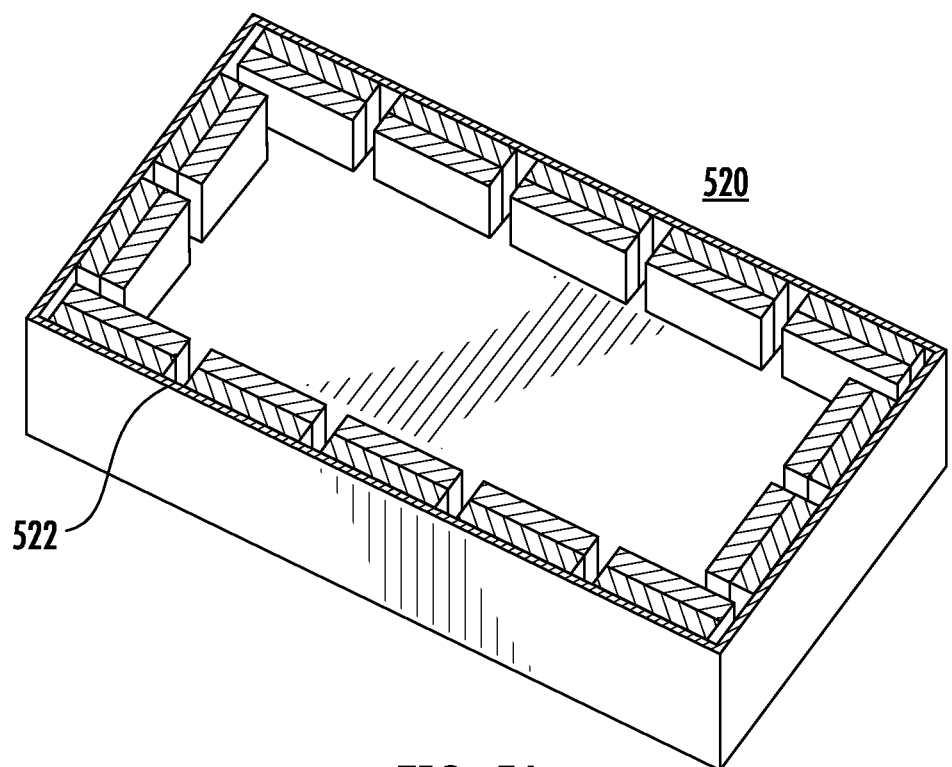
FIG. 5A is a perspective view of an example embodiment of an outer storage vessel.
Figure 5B:
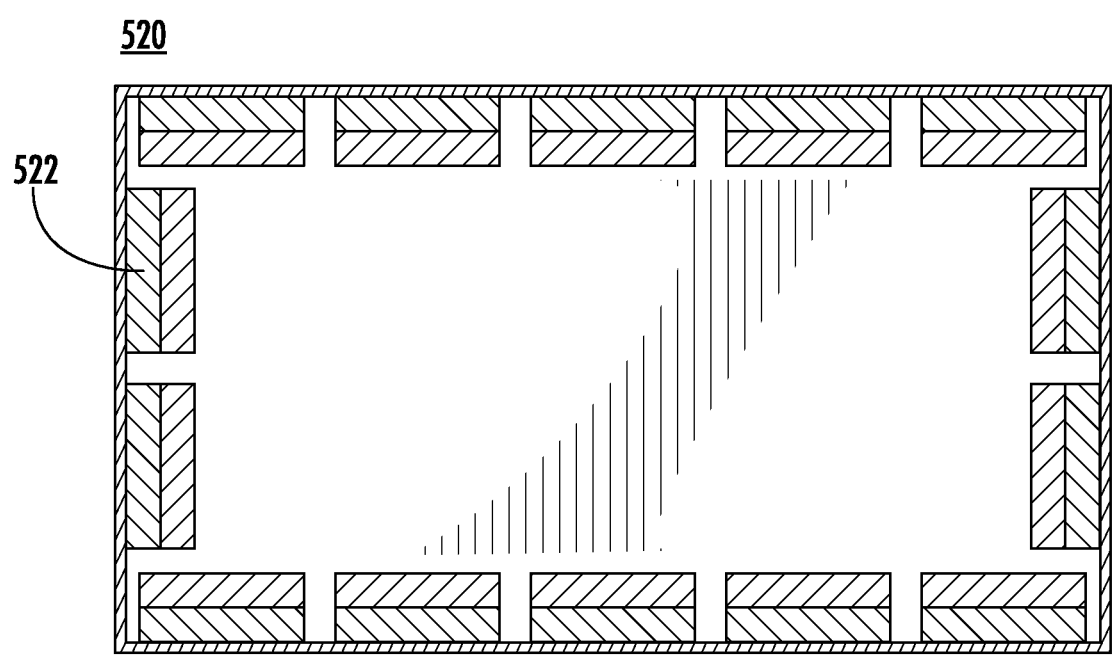
FIG. 5B is a top view of an example embodiment of an outer storage vessel.
Figure 6A:
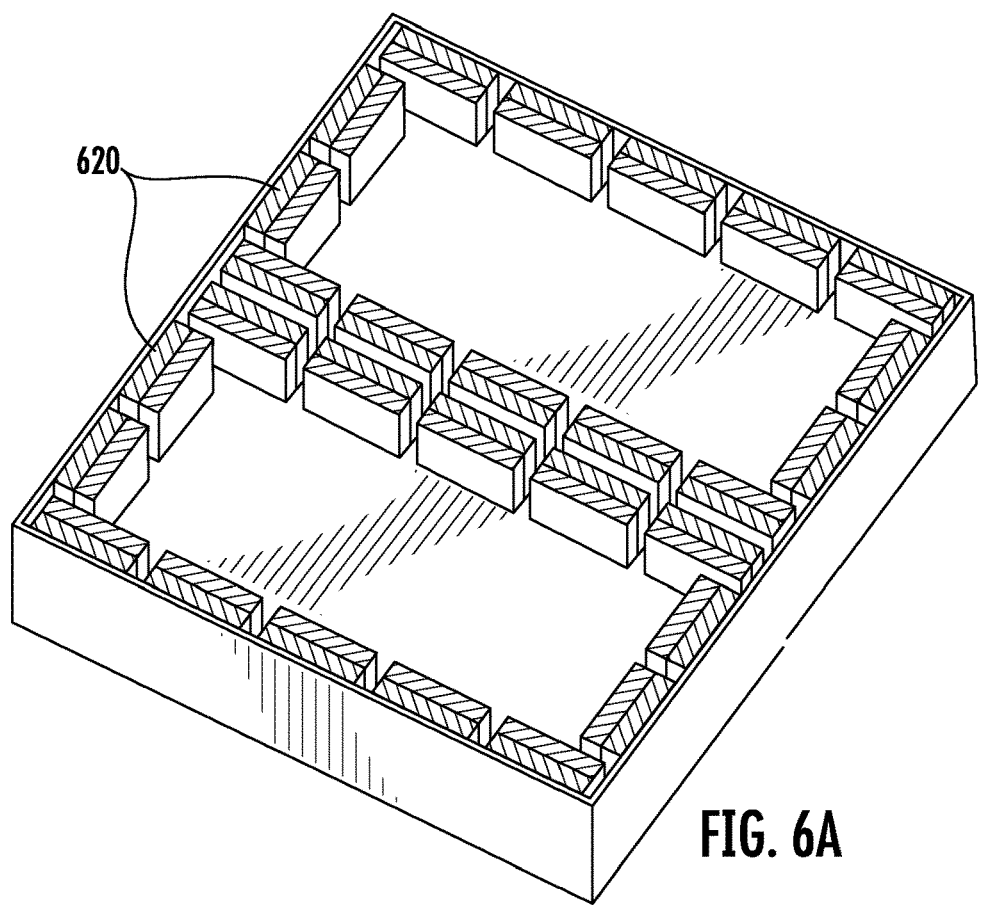
FIG. 6A is a perspective view of an example embodiment of a plurality of outer storage vessels.
Figure 6B:
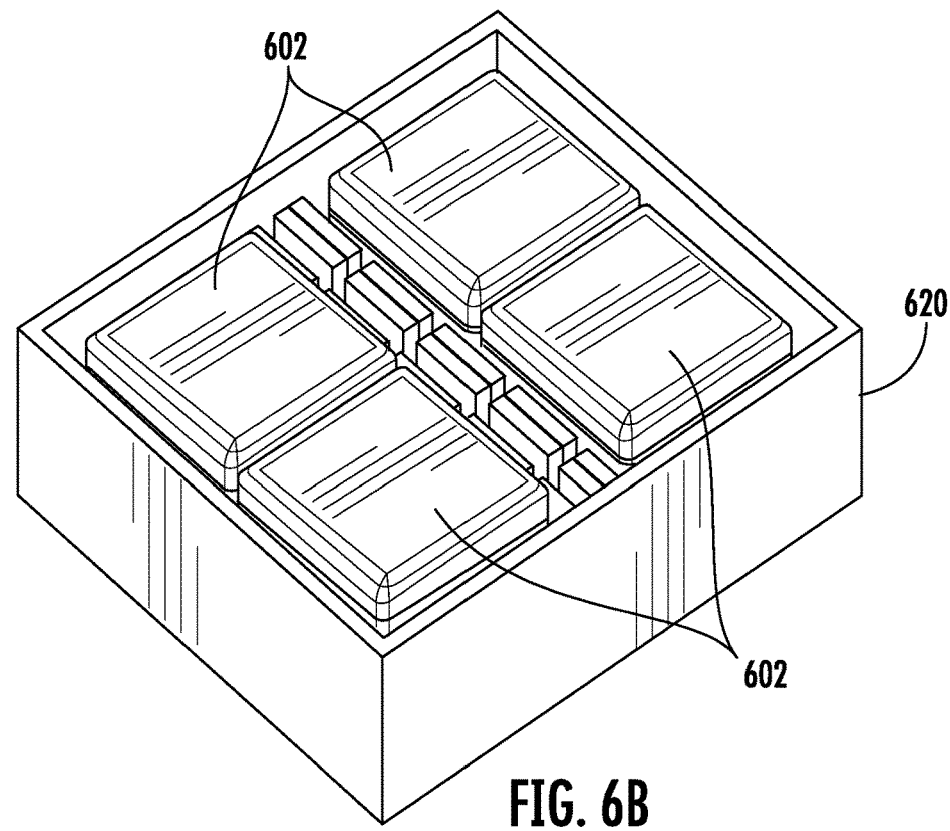
FIG. 6B is a perspective view of FIG. 6A with a plurality of portable vessels.
Figure 7A:
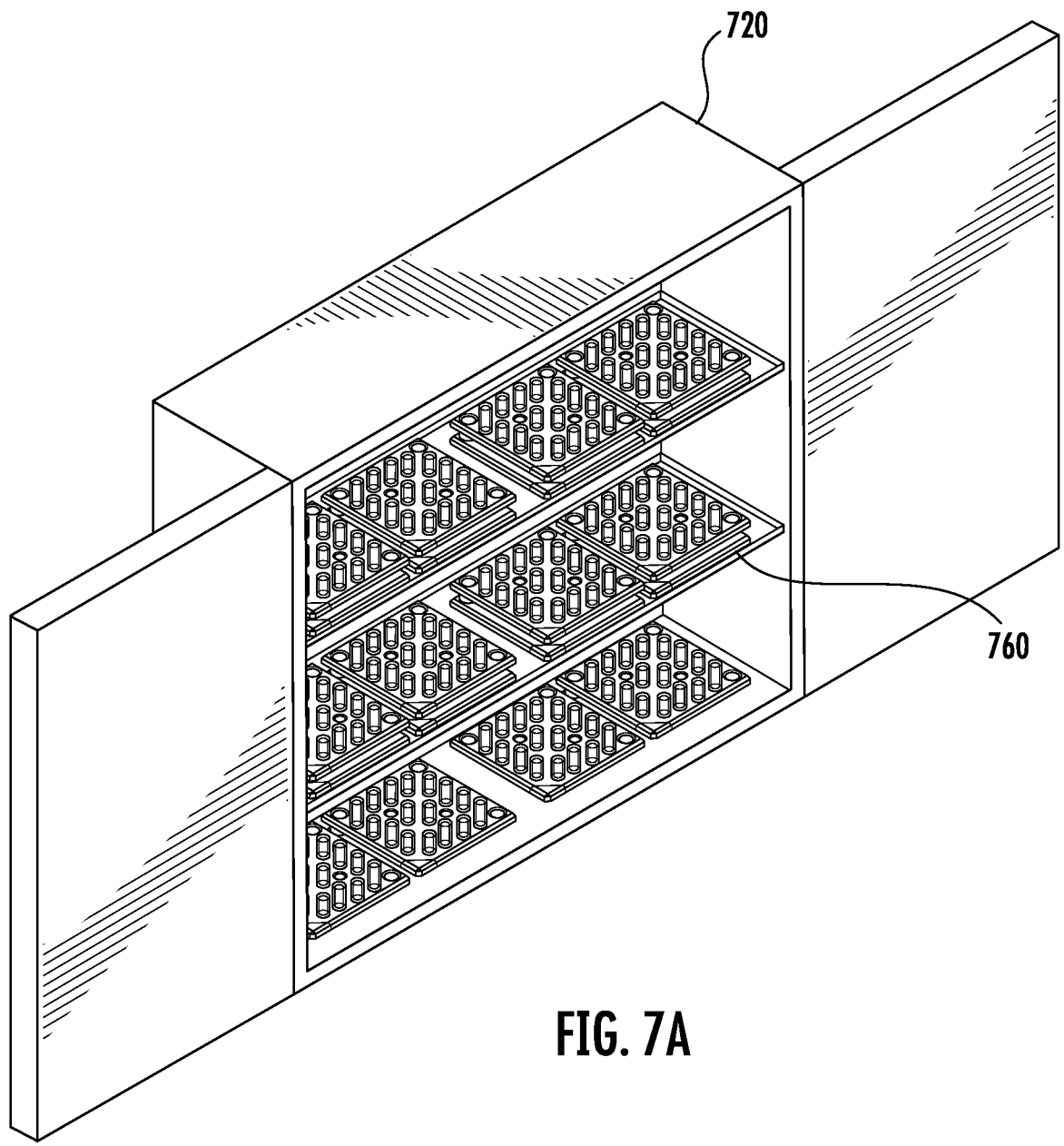
FIG. 7A is a perspective view of an example embodiment of an outer storage vessel.
Figure 7B:
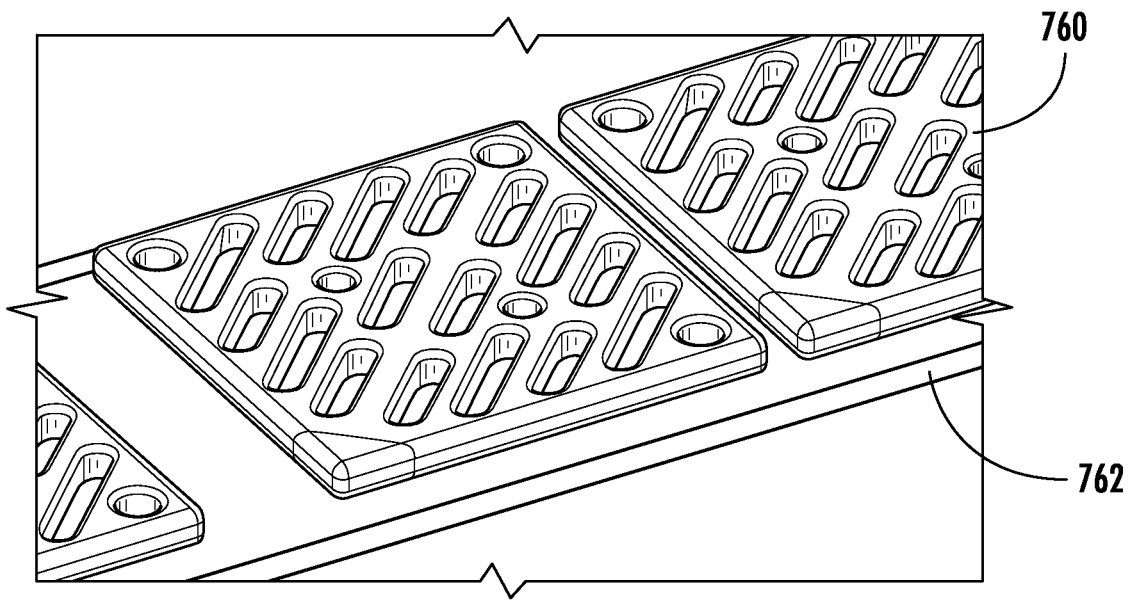
FIG. 7B is a zoomed in perspective view of FIG. 7A of an outer storage vessel.
Figure 7C:
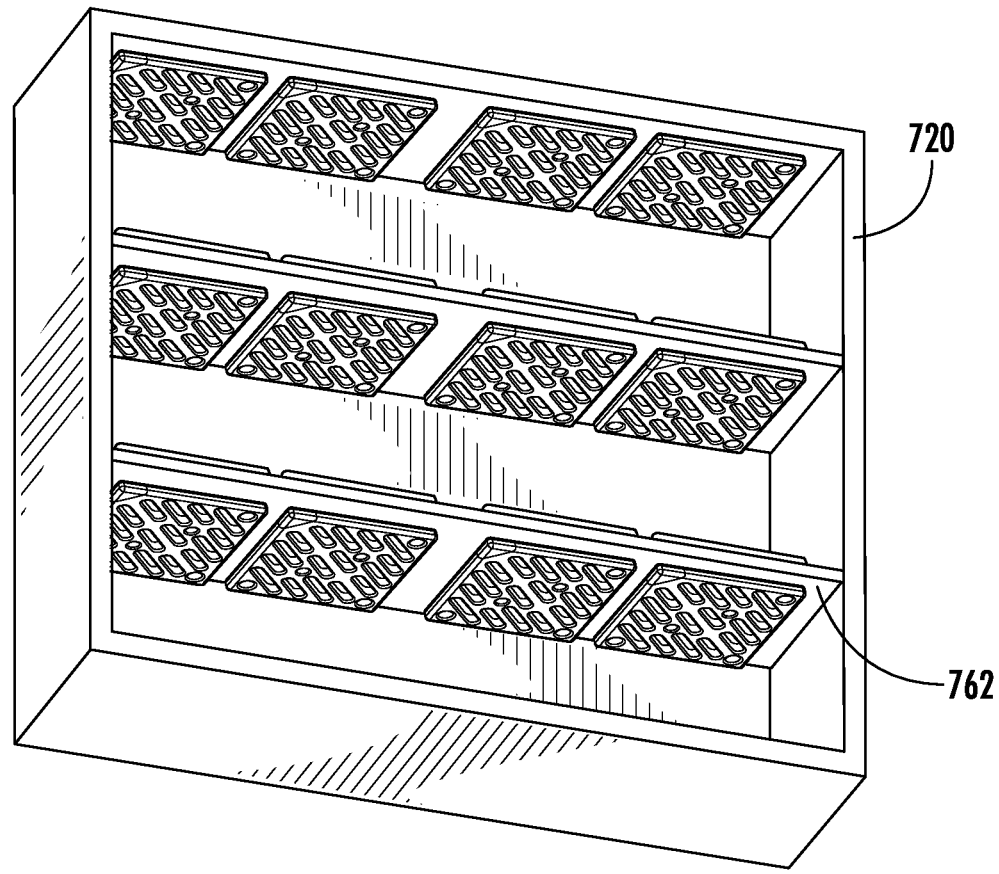
FIG. 7C is a bottom view of a perspective view of an example embodiment of an outer storage vessel.
Figure 7D:
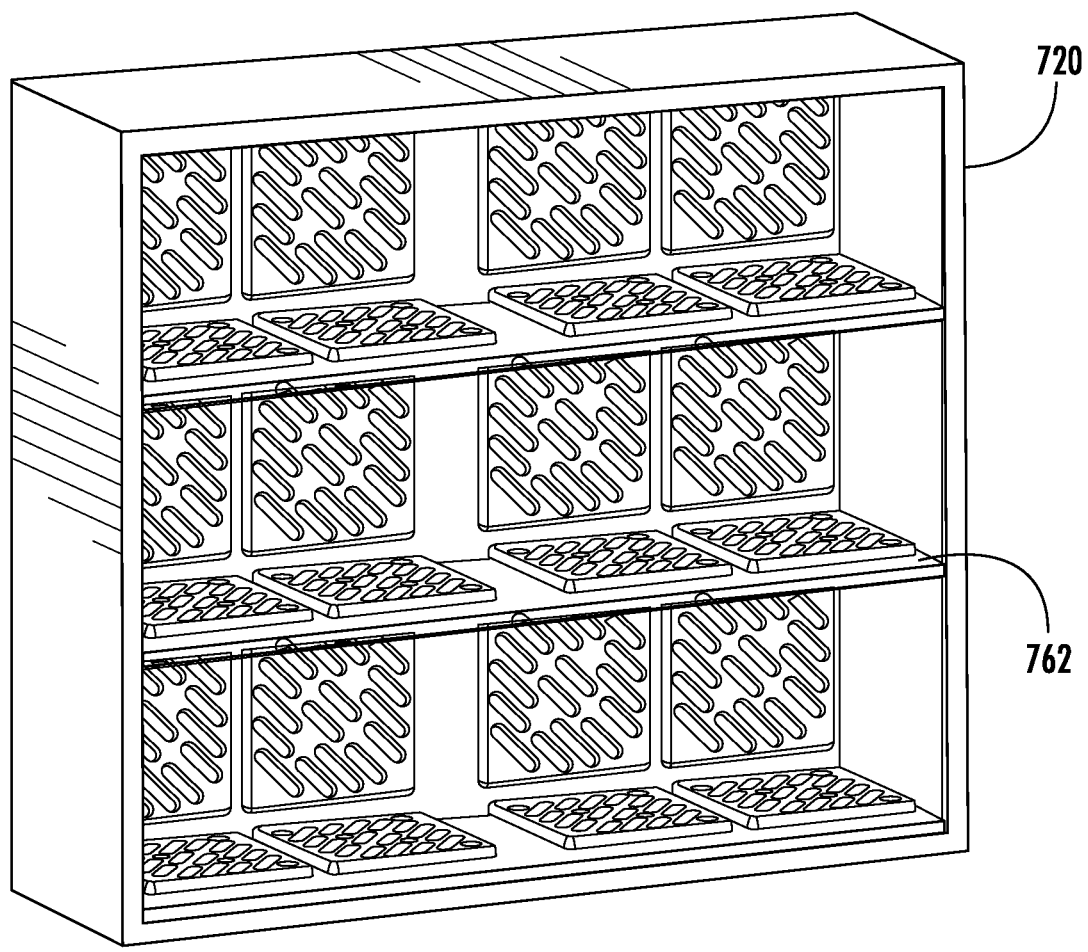
FIG. 7D is a perspective view of an additional example embodiment of an outer storage vessel.

Referring now to FIGS. 3A-C and 4A-D, in some embodiments, the payload is disposed in a payload storage vessel 330 and 404 which is subsequently disposed in the portable storage vessel. The payload storage vessel 330 and 404 can comprise or include a thermally insulating material 332 and/or one or more PCMs consistent with the objectives of the present disclosure. In some embodiments, the payload is distributed across a plurality of payload storage vessels, as depicted in FIGS. 3A-C, which are together disposed in the portable storage vessel. In certain embodiments however, one or more payload storage vessels are not thermally insulating and/or do not contain a PCM, See, for example FIGS. 4A-D.

In some embodiments, one or more PCMs are disposed in a thermal storage cell. Thermal storage cells described herein comprise a container and a phase change material disposed within an interior volume of the container. Containers of thermal storage cells described herein comprise an exterior surface defining an interior or internal volume. A container used in a thermal storage cell of a system described herein can have any shape or arrangement consistent with the present disclosure. For example, in some embodiments, the container has the form or shape of a plate, blade, grid, or panel. The plate, blade, grate, grid, or panel (referred to collectively as a "container" below, for convenience) can be generally square or rectangular in cross section (e.g., such that the container is a relatively short or "flat" rectangular cylinder). Additionally, the container may include a fill spout. The fill spout (when in in an open configuration, as opposed to a closed or sealed configuration) provides fluid communication between the interior volume and the external environment of the container. The exterior surface of the container includes a front side, a back side, and at least four corners. The fill spout is disposed at one of the corners of the exterior surface.

Further, in some preferred embodiments, a container described herein may also comprise a cap, as seen in FIGS. 4A-D. More particularly, such a cap can cover, enclose, or "complete" the corner where the fill spout is disposed. Thus, in some cases, for instance, surfaces of the cap align with the exterior surface of the container to conceal the corner fill spout.

For example, in some embodiments, the container can be generally square or rectangular in cross section (e.g., such that the container is a relatively short or "flat" rectangular cylinder). Moreover, in certain preferred embodiments, the container has a relatively high surface area to volume ratio. For example, in some cases, the container can have a surface area to volume ratio (e.g., in units of $cm^2/cm^3$) of at least 1:2, at least 1:3, at least 1:4, at least 1:5, at least 1:10, at least 1:20, at least 1:50, or at least 1:100. In some embodiments, the container has a surface area to volume ratio between about 1:3 and 1:100, between about 1:3 and 1:50, between about 1:5 and 1:100, between about 1:5 and 1:50, or between about 1:10 and about 1:100. Similarly, in some cases, the average thickness of the container can be relatively small compared to the average length and average width of the container. For instance, in some embodiments, the average length and the average width of the container are at least 5 times, at least 10 times, at least 20 times, or at least 50 times the average thickness of the container. In some cases, the average length and the average width of the container are 5-100, 5-50, 5-20, 10-100, or 10-50 times the average thickness of the container.

Moreover, in some preferred implementations, the exterior surface of the container further comprises one or more protrusions. The protrusions extend in an orthogonal or substantially orthogonal (e.g., within 15 degrees, within 10 degrees, or within 5 degrees of orthogonal) direction from the back side of the container. As further described herein, in some cases, the one or more protrusions are configured or operable to form a gap between the back side of the container and an adjacent surface, such as a wall against which the container is disposed or another container with which the container is stacked. The protrusions can thus act as a spacer.

In addition, in some embodiments, the exterior surface of the container further comprises one or more channels extending from the front side to the back side and connecting the front side to the back side. These channels may also be described as through holes or perforations of the container.

In some cases, at least 90% of the interior volume of a container is occupied by the PCM (which may be referred to below as a "thermal management material"). In other cases, at least 95%, at least 96%, at least 97%, at least 98%, or at least 99% of the interior volume is occupied by the thermal management material. In other embodiments, the thermal management material occupies 50-100%, 60-100%, 70-100%, 80-100%, 90-100%, 90-99%, 90-98%, 95-100%, or 95-98% of the interior volume of the container.

The exterior surface of container, in some embodiments, is operable to facilitate heat transfer between an external environment and the interior volume, or between the external environment and a PCM disposed within the interior volume. For example, in some embodiments, the exterior surface can comprise or be formed from one or more materials that facilitate heat transfer, such as a thermal exchange material or a thermally conductive material. Any material operable to permit thermal exchange from the container to the external environment can be used. Thermally conductive materials which may form one or more materials of the container described herein have a thermal conductivity greater than or equal to a thermal conductivity of the PCM disposed within the interior volume of the container(s). Specifically, in some embodiments, the thermally conductive material has a thermal conductivity higher than a thermal conductivity of the PCM within the interior volume of the container. Thermally conductive materials which may form one or more materials of the container described herein may have a thermal conductivity of at least 0.2 W/m*K. For example, in some embodiments, thermally conductive materials have a thermal conductivity of at least 0.4 W/m*K, such as at least 0.5 W/m*K, at least 0.75 W/m*K, or at least W/m*K. In some instances, a thermally conductive material has a thermal conductivity of between 0.2 and 450 W/m*K, such as between 0.4 W/m*K and 450 W/m*K, 0.2 and 400 W/m*K, 0.2 and 350 W/m*K, 0.2 and 300 W/m*K, 0.2 and 250 W/m*K, 0.2 and 200 W/m*K, 0.2 and 150 W/m*K, or 0.2 and 100 W/m*K. In some instances, the thermally conductive material has a thermal conductivity of between 0.2 and 90 W/m*K, 0.2 and 75 W/m*K, 0.2 and 50 W/m*K, and 0.2 and 25 W/m*K. In certain other implementations, the thermally conductive material has a thermal conductivity of between 0.4 and 400 W/m*K, 0.4 and 350 W/m*K, 0.4 and 300 W/m*K, and 250 W/m*K, 0.4 and 200 W/m*K, 0.4 and 150 W/m*K, or 0.4 and 100 W/m*K. In yet further embodiments, the thermally conductive material has a thermal conductivity of between and 90 W/m*K, 0.4 and 75 W/m*K, 0.4 and 50 W/m*K, and 0.4 and 25 W/m*K. In still further embodiments, the thermally conductive material has a thermal conductivity of at least 7 W/m*K, such as between 7 and 450 W/m*K. Additionally, in some instances, a thermal conductivity of the container is at least one order of magnitude higher than a thermal conductivity of the PCM, such as at least two orders of magnitude higher, or at least three orders of magnitude higher. Not intending to be bound by theory, a container being formed from one or more materials which has a thermal conductivity one or more orders of magnitude higher than the PCM within the container may facilitate heat absorption and/or dissipation, thereby reducing "charging" time of the thermal storage cell and increasing the buffer time of the thermal storage battery while being "discharged."

Some non-limiting examples of materials usable for containers of thermal storage cells described herein include a polymeric or plastic material (such as a polyethylene, polypropylene, polyethylene terephthalate, polyvinyl chloride, polycarbonate, polyoxymethylene, acrylonitrile butadiene styrene, or polyether ether ketone), a metal or mixture or alloy of metals (such as aluminum), and a composite material (such as a composite fiber or fiberglass). It is to be understood that the material forming or used to form the exterior surface of the container, in some preferred embodiments, can generally form or define the entire body of the container or substantially the entire body of the container. Additionally, the material used to form the exterior surface (or the entire body or substantially the entire body of the container) can be non-breathable or non-permeable to water, and/or non-flammable or fire-resistant. Moreover, in some instances, the material used to form the exterior surface (or the entire body or substantially the entire body of the container) is non-electrically conductive, or has low or minimal electrical conductivity, such that the material is considered an electrical insulator rather than an electrical conductor. The use of a non-electrically conductive material to form the exterior surface of a container described herein may be especially desirable, for example, if the container is placed in a room or space in which sensitive and/or expensive electronic devices are used, such as a telecommunications data room or data center in which computer systems and associated components are housed.

Further, in some cases, a thermally conductive material described above can be dispersed within a non-thermally conductive material or within a less thermally conductive material. In some embodiments, for example, a thermally conductive material comprises a paint, ink, or pigment, or a metal dispersed in a paint, ink, or pigment. Moreover, the paint, ink, or pigment can be used to form a design or decorative feature on the exterior surface of the container.

Additionally, the material forming the exterior surface (or the entire body or substantially the entire body of the container) can have any thickness not inconsistent with the objectives of the present disclosure. In some embodiments, the thickness is selected based on a desired mechanical strength and/or thermal conductivity. For example, in some cases, the average thickness of the material forming the exterior surface (or the entire body or substantially the entire body of the container) is less than 10 mm, less than 5 mm, less than 3 mm, or less than 1 mm. In some embodiments, the average thickness is between 1 and 10 mm, between 1 and 5 mm, between 1 and 3 mm, between 3 mm and 10 mm, between 3 mm and 5 mm, or between 5 mm and 10 mm.

Moreover, in some embodiments, the exterior surface of the container can have one or more features, such as edges that are flat, rounded, bullnose, or beveled connecting the front and back sides of the exterior surface. Other features of a container can include one or more recessed regions, protrusions, and/or channels. In some cases, one or more features present on the front side of the container are also present on the back side of the container. In other instances, the front side can include one or more features absent from the back side of the container, or vice versa.

In some embodiments, the exterior surface can further comprise one or more channels, through-holes, or perforations. As described above, one or more channels present in a container can increase the surface area of the container or air flow "through" the container (from the front side to the back side). The presence, number, and size of channels can also be selected based on a desired thermal storage capacity of the container (e.g., as determined by a volume or mass of PCM disposed within the interior volume of the container, where a larger total channel volume corresponds to a smaller total volume of PCM, for a given size container). The channels can have any shape not inconsistent with the objectives of the present disclosure. For example, in some cases, a channel has a shape (e.g., a sectional shape when viewed from the front or the back side of the container) that is generally circular, oval, or oblong. The shape can also be a polygonal shape having sharp or rounded corners. Further, in some embodiments, the channels (or the "sidewalls" of the channels) can have straight, rounded, beveled, or bullnose edges connecting the front and back sides of the exterior surface.

Additionally, in some example embodiments, a container described herein further comprises a fill spout having an opening in fluid communication with the interior volume of the container and an external environment of the container.

In some cases, the fill spout is generally cylindrical in shape. However, other shapes may also be used. The fill spout, in some embodiments, is disposed at one of the corners of the exterior surface. In some embodiments, the fill spout further comprises an air outlet. The air outlet is operable to allow displaced air to exit the internal volume while filling the thermal management container via the fill spout.

Containers described herein can be formed from any material not inconsistent with the objectives of the present disclosure. For example, in some embodiments, containers described herein comprise or are formed from a material which is operable to facilitate heat transfer between an external environment and the interior volume, or between the external environment and a PCM disposed within the interior volume. For example, in some embodiments, the container's exterior surface can comprise or be formed from one or more materials that facilitate heat transfer, such as a thermal exchange material or a thermally conductive material. Any material operable to permit thermal exchange from the container to the external environment can be used. Some non-limiting examples of materials suitable for use in forming a container described herein include a polymeric or plastic material (such as a polyethylene, a polypropylene, polyethylene terephthalate, polyvinyl chloride, polycarbonate, polyoxymethylene, acrylonitrile butadiene styrene, or a polyether ether ketone), a metal or mixture or alloy of metals (such as aluminum), and a composite material (such as a composite fiber or fiberglass). It is to be understood that the material forming or used to form the container or the exterior surface of the container, in some preferred embodiments, can generally form or define the entire body of the container or substantially the entire body of the container.

Any phase change material ("PCM") or combination of PCMs not inconsistent with the objectives of the present disclosure may be used in a system or method described herein. PCMs in systems described herein may be selected individually or may be selected to have coordinating or cooperating phase transition temperatures. Moreover, the PCM (or combination of PCMs) used in a particular instance can be selected based on a relevant operational temperature range for the specific end use or application, such as a desired temperature or thermal capacity at a certain temperature or across a desired range of temperatures. As understood by one having ordinary skill in the art, a phase transition temperature described herein (such as a phase transition temperature of "X"° C., where X may be −20° C., for example) may be represented as a normal distribution of temperatures centered on X° C. In addition, as understood by one having ordinary skill in the art, a PCM described herein can exhibit thermal hysteresis, such that the PCM exhibits a phase change temperature difference between the "forward" phase change and the "reverse" phase change (e.g., a solidification temperature that is different from the melting temperature). In some embodiments, the PCM has a phase transition temperature within one of the ranges of Table 1 below.

TABLE 1

Phase transition temperature ranges for PCMs (at a pressure of 1 atm).
Phase Transition Temperature Ranges −10° C. to 0° C.
−20° C. to −10° C.
−30° C. to −20° C.
−30° C. to −10° C.
−50° C. to −30° C.
−25° C. to −15° C.

TABLE 1-continued

Phase transition temperature ranges for PCMs (at a pressure of 1 atm).
Phase Transition Temperature Ranges −25° C. to −10° C.
−80° C. to −70° C.
−75° C. to −55° C.
−80° C. to −50° C.
−50° C. to 0° C.
0–6° C.
6–8° C.
2–8° C.

Moreover, in certain embodiments, it may be desirable or even preferable that a phase transition temperature of one PCM or mixture of PCMs is at or near a temperature of the payload. Any desired room temperature or external temperature and associated phase transition temperature can be used.

As described further herein, a particular range can be selected based on the desired application. For example, PCMs having a phase transition temperature of −80° C. to −55° C. can be especially desirable in a first cooling zone to assist in cooling or maintaining a temperature of a payload which may otherwise be stored in an ultra-low temperature freezer (such as a freezer capable of reaching −86° C.), while PCMs having a phase transition temperature of 6-8° C. can be especially desirable for maintaining the temperature of a payload which may otherwise be stored in a refrigerated environment. As another non-limiting example, PCMs having a phase transition between −40° C. and −10° C. can be preferred for use with payloads which otherwise may be stored in a commercial freezer, or as an intermediate layer.

Further, a PCM of a device or method described herein can either absorb or release energy using any phase transition not inconsistent with the objectives of the present disclosure. For example, the phase transition of a PCM described herein, in some embodiments, comprises a transition between a solid phase and a liquid phase of the PCM, or between a solid phase and a mesophase of the PCM. A mesophase, in some cases, is a gel phase. Thus, in some instances, a PCM undergoes a solid-to-gel transition. A solid to solid transition is also possible. Further, in some embodiments, a PCM undergoes a solid to gas transition.

Moreover, in some cases, a PCM or mixture of PCMs has a phase transition enthalpy or latent heat of at least about 50 kJ/kg or at least about 100 kJ/kg. In other embodiments, a PCM or mixture of PCMs has a phase transition enthalpy of at least about 150 kJ/kg, at least about 200 kJ/kg, at least about 300 kJ/kg, or at least about 350 kJ/kg. In certain embodiments, a PCM or mixture of PCMs has phase transition enthalpy of at least about 400 kJ/kg, at least about 450 kJ/kg, at least about 500 kJ/kg, or at least about 550 kJ/kg. In some instances, a PCM or mixture of PCMs has a phase transition enthalpy between about 50 kJ/kg and about 350 kJ/kg, between about 100 kJ/kg and about 350 kJ/kg, between about 100 kJ/kg and about 220 kJ/kg, or between about 100 kJ/kg and about 250 kJ/kg. In certain instances, a PCM or mixture of PCMs has a phase transition enthalpy of between about 75 kJ/kg and about 225 kJ/kg, between about 100 kJ/kg and about 250 kJ/kg, between about 125 kJ/kg and 275 kJ/kg, between about 150 kJ/kg and about 300 kJ/kg, between about 200 kJ/kg and about 350 kJ/kg, or between about 500 kJ/kg and about 600 kJ/kg.

In addition, a PCM of a device or method described herein can have any composition not inconsistent with the objectives of the present disclosure. In some embodiments, for instance, a PCM comprises an inorganic composition. In other cases, a PCM comprises an organic composition. In some instances, a PCM comprises a salt hydrate. Suitable salt hydrates include, without limitation, $CaCl_2 \cdot 6H_2O$ and/or other $CaCl_2$ hydrates, $Ca(NO_3)_2 \cdot 3H_2O$, $NaSO_4 \cdot 10H_2O$, $Na(NO_3)_2 \cdot 6H_2O$, $Zn(NO_3)_2 \cdot 2H_2O$, $FeCl_3 \cdot 2H_2O$, $Co(NO_3)_2 \cdot 6H_2O$, $Ni(NO_3)_2 \cdot 6H_2O$, $MnCl_2 \cdot 4H_2O$, $CH_3COONa \cdot 3H_2O$, $LiC_2H_3O_2 \cdot 2H_2O$, $MgCl_2 \cdot 4H_2O$, $NaOH \cdot H_2O$, $Cd(NO_3)_2 \cdot 4H_2O$, $Cd(NO_3)_2 \cdot 1H_2O$, $Fe(NO_3)_2 \cdot 6H_2O$, $NaAl(SO_4)_2 \cdot 12H_2O$, $FeSO_4 \cdot 7H_2O$, $Na_3PO_4 \cdot 12H_2O$, $Na_2B_4O_7 \cdot 10H_2O$, $Na_3PO_4 \cdot 12H_2O$, $LiCH_3COO \cdot 2H_2O$, $NH_4Br$ hydrates, KBr hydrates, NaBr hydrates, $CaBr_2$ hydrates and/or mixtures thereof. The PCM may also be water. In some embodiments, the PCM is not water. The PCM may also be dry ice. In other embodiments, the PCM is not dry ice. Further, in certain embodiments, no PCM in a system described herein is dry ice and does not comprise dry ice.

In other embodiments, a PCM comprises a fatty acid. A fatty acid, in some embodiments, can have a C4 to C28 aliphatic hydrocarbon tail. Further, in some embodiments, the hydrocarbon tail is saturated. Alternatively, in other embodiments, the hydrocarbon tail is unsaturated. In some embodiments, the hydrocarbon tail can be branched or linear. Non-limiting examples of fatty acids suitable for use in some embodiments described herein include caprylic acid, capric acid, lauric acid, myristic acid, palmitic acid, stearic acid, arachidic acid, behenic acid, lignoceric acid, and cerotic acid. In some embodiments, a PCM described herein comprises a combination, mixture, or plurality of differing fatty acids. For reference purposes herein, it is to be understood that a chemical species described as a "Cn" species (e.g., a "C4" species or a "C28" species) is a species of the identified type that includes exactly "n" carbon atoms. Thus, a C4 to C28 aliphatic hydrocarbon tail refers to a hydrocarbon tail that includes between 4 and 28 carbon atoms.

In some embodiments, a PCM comprises an alkyl ester of a fatty acid. Any alkyl ester not inconsistent with the objectives of the present disclosure may be used. For instance, in some embodiments, an alkyl ester comprises a methyl ester, ethyl ester, isopropyl ester, butyl ester, or hexyl ester of a fatty acid described herein. In other embodiments, an alkyl ester comprises a C2 to C6 ester alkyl backbone or a C6 to C12 ester alkyl backbone. In some embodiments, an alkyl ester comprises a C12 to C28 ester alkyl backbone. Further, in some embodiments, a PCM comprises a combination, mixture, or plurality of differing alkyl esters of fatty acids. Non-limiting examples of alkyl esters of fatty acids suitable for use in some embodiments described herein include methyl laurate, methyl myristate, methyl palmitate, methyl stearate, methyl palmitoleate, methyl oleate, methyl linoleate, methyl docosahexanoate, methyl ecosapentanoate, ethyl laurate, ethyl myristate, ethyl palmitate, ethyl stearate, ethyl palmitoleate, ethyl oleate, ethyl linoleate, ethyl docosahexanoate, ethyl ecosapentanoate, isopropyl laurate, isopropyl myristate, isopropyl palmitate, isopropyl stearate, isopropyl palmitoleate, isopropyl oleate, isopropyl linoleate, isopropyl docosahexanoate, isopropyl ecosapentanoate, butyl laurate, butyl myristate, butyl palmitate, butyl stearate, butyl palmitoleate, butyl oleate, butyl linoleate, butyl docosahexanoate, butyl ecosapentanoate, hexyl laurate, hexyl myristate, hexyl palmitate, hexyl stearate, hexyl palmitoleate, hexyl oleate, hexyl linoleate, hexyl docosahexanoate, and hexyl ecosapentanoate.

In some embodiments, a PCM comprises a fatty alcohol. Any fatty alcohol not inconsistent with the objectives of the present disclosure may be used. For instance, a fatty alcohol, in some embodiments, can have a C4 to C28 aliphatic hydrocarbon tail. Further, in some embodiments, the hydrocarbon tail is saturated. Alternatively, in other embodiments, the hydrocarbon tail is unsaturated. The hydrocarbon tail can also be branched or linear. Non-limiting examples of fatty alcohols suitable for use in some embodiments described herein include capryl alcohol, pelargonic alcohol, capric alcohol, undecyl alcohol, lauryl alcohol, tridecyl alcohol, myristyl alcohol, pentadecyl alcohol, cetyl alcohol, heptadecyl alcohol, stearyl alcohol, nonadecyl alcohol, arachidyl alcohol, heneicosyl alcohol, behenyl alcohol, lignoceryl alcohol, ceryl alcohol, and montanyl alcohol. In some embodiments, a PCM comprises a combination, mixture, or plurality of differing fatty alcohols.

In some embodiments, a PCM comprises a fatty carbonate ester, sulfonate, or phosphonate. Any fatty carbonate ester, sulfonate, or phosphonate not inconsistent with the objectives of the present disclosure may be used. In some embodiments, a PCM comprises a C4 to C28 alkyl carbonate ester, sulfonate, or phosphonate. In some embodiments, a PCM comprises a C4 to C28 alkenyl carbonate ester, sulfonate, or phosphonate. In some embodiments, a PCM comprises a combination, mixture, or plurality of differing fatty carbonate esters, sulfonates, or phosphonates. In addition, a fatty carbonate ester described herein can have two alkyl or alkenyl groups described herein or only one alkyl or alkenyl group described herein.

Moreover, in some embodiments, a PCM comprises a paraffin. Any paraffin not inconsistent with the objectives of the present disclosure may be used. In some embodiments, a PCM comprises n-dodecane, n-tridecane, n-tetradecane, n-pentadecane, n-hexadecane, n-heptadecane, n-octadecane, n-nonadecane, n-eicosane, n-heneicosane, n-docosane, n-tricosane, n-tetracosane, n-pentacosane, n-hexacosane, n-heptacosane, n-octacosane, n-nonacosane, n-triacontane, n-hentriacontane, n-dotriacontane, n-tritriacontane, and/or mixtures thereof.

In addition, in some embodiments, a PCM comprises a polymeric material. Any polymeric material not inconsistent with the objectives of the present disclosure may be used. Non-limiting examples of suitable polymeric materials for use in some embodiments described herein include thermoplastic polymers (e.g., poly(vinyl ethyl ether), poly(vinyl n-butyl ether) and polychloroprene), polyethylene glycols (e.g., CARBOWAX® polyethylene glycol 400, CARBOWAX® polyethylene glycol 600, CARBOWAX® polyethylene glycol 1000, CARBOWAX® polyethylene glycol 1500, CARBOWAX® polyethylene glycol 4600, CARBOWAX® polyethylene glycol 8000, and CARBOWAX® polyethylene glycol 14,000), and polyolefins (e.g., lightly crosslinked polyethylene and/or high density polyethylene).

Additional non-limiting examples of phase change materials suitable for use in some embodiments described herein include BioPCM materials commercially available from Phase Change Energy Solutions (Asheboro, North Carolina), such as BioPCM-(-8), BioPCM-(-6), BioPCM-(-4), BioPCM-(-2), BioPCM-4, BioPCM-6, BioPCM 08, BioPCM-Q12, BioPCM-Q15, BioPCM-Q18, BioPCM-Q20, BioPCM-Q21, BioPCM-Q23, BioPCM-Q25, BioPCM-Q27, BioPCM-Q30, BioPCM-Q32, BioPCM-Q35, BioPCM-Q37, BioPCM-Q42, BioPCM-Q49, BioPCM-55, BioPCM-60, BioPCM-62, BioPCM-65, BioPCM-69, and others.

It is further to be understood that a device described herein can comprise a plurality of differing PCMs, including differing PCMs of differing types. Any mixture or combination of differing PCMs not inconsistent with the objectives of the present disclosure may be used. In some embodiments, for example, a thermal storage cell and/or mixture of PCMs comprises or includes one or more fatty acids and one or more fatty alcohols. Further, as described above, a plurality of differing PCMs, in some cases, is selected based on a desired phase transition temperature and/or latent heat of the mixture of PCMs.

Further, in some embodiments, one or more properties of a PCM described herein can be modified by the inclusion of one or more additives. Such an additive described herein can be mixed with a PCM and/or disposed in a device described herein. In some embodiments, an additive comprises a thermal conductivity modulator. A thermal conductivity modulator, in some embodiments, increases the thermal conductivity of the PCM. In some embodiments, a thermal conductivity modulator comprises carbon, including graphitic carbon. In some embodiments, a thermal conductivity modulator comprises carbon black and/or carbon nanoparticles. Carbon nanoparticles, in some embodiments, comprise carbon nanotubes and/or fullerenes. In some embodiments, a thermal conductivity modulator comprises a graphitic matrix structure. In other embodiments, a thermal conductivity modulator comprises an ionic liquid. In some embodiments, a thermal conductivity modulator comprises a metal, including a pure metal or a combination, mixture, or alloy of metals. Any metal not inconsistent with the objectives of the present disclosure may be used. In some embodiments, a metal comprises a transition metal, such as silver or copper. In some embodiments, a metal comprises an element from Group 13 or Group 14 of the periodic table. In some embodiments, a metal comprises aluminum. In some embodiments, a thermal conductivity modulator comprises a metallic filler dispersed within a matrix formed by the PCM. In some embodiments, a thermal conductivity modulator comprises a metal matrix structure or cage-like structure, a metal tube, a metal plate, and/or metal shavings. Further, in some embodiments, a thermal conductivity modulator comprises a metal oxide. Any metal oxide not inconsistent with the objectives of the present disclosure may be used. In some embodiments, a metal oxide comprises a transition metal oxide. In some embodiments, a metal oxide comprises alumina.

In other embodiments, an additive comprises a nucleating agent. A nucleating agent, in some embodiments, can help avoid sub-cooling, particularly for PCMs comprising finely distributed phases, such as fatty alcohols, paraffinic alcohols, amines, paraffins, or for certain salt hydrate containing solutions. Any nucleating agent not inconsistent with the objectives of the present disclosure may be used. In still other instances, an additive comprises a fire retardant or fire-resistant material.

In some embodiments, one or more of the PCMs of a system described herein are disposed within, such as embedded, dispersed, or in matrix with a foam. A foam in such embodiments, may have one or more desirable thermal properties. In some embodiments, for instance, a foam made by a method described herein has a latent heat of at least about 50 kJ/kg. In some embodiments, a foam has a latent heat of at least about 75 kJ/kg. In some embodiments, a foam has a latent heat of at least about 90 kJ/kg. In some embodiments, a foam has a latent heat of at least about 100 kJ/kg. In some embodiments, a foam has a latent heat of at least about 110 kJ/kg, at least about 115 kJ/kg, or at least about 125 kJ/kg. In some embodiments, a foam has a latent heat between about 50 kJ/kg and about 150 kJ/kg. In some embodiments, a foam has a latent heat between about 75 kJ/kg and about 125 kJ/kg, between about 75 kJ/kg and about 110 kJ/kg, between about 75 kJ/kg and about 100 kJ/kg, between about 90 kJ/kg and about 125 kJ/kg, or between about 90 kJ/kg and about 110 kJ/kg. Further, the latent heat of a foam described herein is associated with a transition between two condensed phases or states of a PCM of the foam, such as a transition between a solid phase and a liquid phase, between a solid phase and a mesophase, between a solid state and a gel state, or between two solid states. A mesophase, in some embodiments, comprises a phase intermediate between a solid phase and a liquid phase. In addition, it is contemplated herein that, in some embodiments, a PCM or latent heat storage material may have more than one latent heat associated with a transition between two condensed phases or states, such as a first latent heat associated with a crystalline solid-amorphous solid transition and a second latent heat associated with a solid-liquid transition. In some embodiments comprising a PCM or latent heat storage material having more than one latent heat associated with a transition between two condensed phases, one of the latent heats has a value described hereinabove. In other embodiments, a plurality or all of the latent heats have a value described hereinabove.

Further, in some embodiments, a foam described herein exhibits other desirable properties for latent heat storage applications. For example, in some embodiments, a foam is non-flammable or substantially non-flammable. For reference purposes herein, a non-flammable or substantially non-flammable foam has a rating of A1, A2, or B1 when measured according to DIN 4102. Moreover, in some embodiments, a foam does not "sweat" or release a PCM or latent heat storage material at a temperature above a transition temperature of the PCM or latent heat storage material described herein, permitting the use of the foam in various applications requiring little or no "sweating" or flow. In some embodiments, a foam described herein does not "sweat" due to the viscosity of a gel formed as described herein. In some embodiments, a foam described herein does not "sweat" due to cross-linking between one or more components of the first and second mixtures described herein. Therefore, in some embodiments, foams described herein can be used in various construction and engineering applications without the need for microencapsulation of the PCM or latent heat storage material.

In addition, in some embodiments, a foam described herein has a density, flexibility, and/or mechanical strength similar to that of an otherwise similar foam not comprising a PCM or latent heat storage material dispersed in the foam. For example, in some embodiments, a foam described herein has a density between about 2 pounds per cubic foot (PCF) and about 8 PCF. Moreover, in some embodiments, a foam described herein comprises an open-cell foam. Alternatively, in other embodiments, a foam described herein comprises a closed-cell foam. In some embodiments, a foam described herein comprises a polyurethane foam. In some embodiments, a foam described herein comprises a polyester foam. In some embodiments, a foam described herein comprises a polystyrene foam. In some embodiments, a foam described herein comprises one or more of an aerogel foam, a polyethylene foam, a starch foam, a cellulosic foam, and/or a cellulosic matrix or composite or corrugate foam.

Referring now to FIGS. 5A-B, 6A-B, and 7A-D, systems described herein can further comprise at least one outer storage vessel 520, 620, and 720 having one or more thermally insulating materials and/or one or more PCMs. In some embodiments, an outer storage vessel has at least two PCMs 522. The PCMs of the outer storage vessel may be chosen to correspond to one or more phase transition temperatures of the PCMs disposed in the portable storage vessel 602 and/or to one another. Further, systems described herein may optionally include additional portable storage vessels 602 which may include one or more thermally insulating materials and/or PCMs. Additional system features may include shelves (FIG. 2B 222, FIGS. 8A-D) wherein PCMs are dispersed, wherein each shelf may have a different PCM or they may all be the same. Further, such shelf's may be used in combination with or as a series of cooling stages, or otherwise configured with a variety of PCM to optimize cooling needs. Incorporation of shelves allows for traditional storage and stacking, while allowing dissipation of the effects across the payload. Such systems can provide greater modularity or modality, permitting storage across a wider array of temperatures and/or for longer periods of time without inclusion of or in addition to traditional chillers, refrigerators, commercial freezers, or ultra-low temperature freezers.

II. Temperature Buffered Storage and Transport Systems

Continuing with FIGS. 5A-B, 6A-B, and 7A-D. In addition to the systems described herein above in Section I, systems are described herein which may provide certain additional benefits. For example, in some embodiments, systems described herein may provide additional protection to prevent or mitigate "cold shock" of a payload. "Cold shock" as referenced herein, indicates that a temperature of the payload experiences at least one of 1) a reduction in temperature below a desired point; 2) a reduction in temperature at a rate greater than a desired rate of temperature decrease as a result of thermal energy absorption by at least one of the phase change materials or other source of cooling provided within the system.

In some embodiments of such a system described herein, a portable storage vessel comprises a first temperature management zone, a second temperature management zone, and a third temperature management zone, within an outer storage vessel 520, 620, and 720. Similarly, the portable storage vessel may not be accompanied by an outer storage vessel. One or more of the first, second, and/or third temperature management zones can be used to buffer the temperature decline of the payload. In some embodiments, this buffering is accomplished by disposing a PCM having a higher phase transition temperature radially inward of a PCM having a lower phase transition temperature. For example, a first phase transition temperature may be X° C., a second phase transition temperature may be between (X-10)° C. and (X-15)° C., or stated otherwise, between about 10 and 15° C. lower than the first phase transition temperature. The third phase transition temperature, in such a configuration, can be higher than the second phase transition temperature. The third phase transition temperature may be the same or substantially the same as the first phase transition temperature. Alternatively, the third phase transition temperature can be between about 10 and 15° C. higher than the first phase transition temperature.

In certain other embodiments, the phase transition temperatures may follow the stair step increase regime outlined for certain embodiments of Section I described herein above. In such embodiments, buffering of the payload temperature or of the payload's temperature decline may be accomplished by disposing a "charged" first phase change material in the first temperature management zone, the first phase change material having a phase transition temperature which is at or below a desired temperature or desired temperature range of the payload. A "charged" phase change material for reference purposes herein, indicates a phase change material which is in a first state below its phase transition temperature. For example, a solid to liquid phase change material having a phase transition temperature of 0° C. may be "charged" if it is in the solid phase or substantially in the solid phase. The second phase change material in the second temperature management zone radially outward from the first temperature management zone can, in some such embodiments, be disposed in the second temperature management zone in an "uncharged" state or phase. An "uncharged" phase change material for reference purposes herein, indicates a phase change material which is in a second state above its phase transition temperature. For example, a solid to liquid phase change material having a phase transition temperature of 0° C. may be "uncharged" if it is in the liquid phase or substantially in the liquid phase. Not intending to be bound by theory, the first phase change material which is "charged" absorbs thermal energy from the second phase change material which is "uncharged". The second phase change material therefore provides temperature resiliency of the initial discharge cycle of the first phase change material to prevent or delay a temperature decline within the vessel until the second phase change material becomes charged. The second phase change material may then continue to prevent or mitigate temperature increase of the payload as it is "charged" and absorbs thermal energy from the external environment and/or the payload.

Referring now to FIGS. 8A-D, wherein FIG. 8A illustrates a perspective view of an example embodiment with a desired temperature range 2-8° C. FIG. 8B illustrates a perspective view of an example embodiment with a desired temperature range −20° C. FIG. 8C illustrates a perspective view of an example embodiment with a desired temperature range −50° C. FIG. 8D illustrates a perspective view of an example embodiment with a desired temperature range −70° C. Wherein the portable storage vessels may be color coded to perform interchanging of PCM containers for tuning a portable vessel to a desired temperature range. In one aspect, the customization allows for exchangeable PCM units to be rapidly deployed within the portable storage vessels.

III. Methods

Figure 9B:
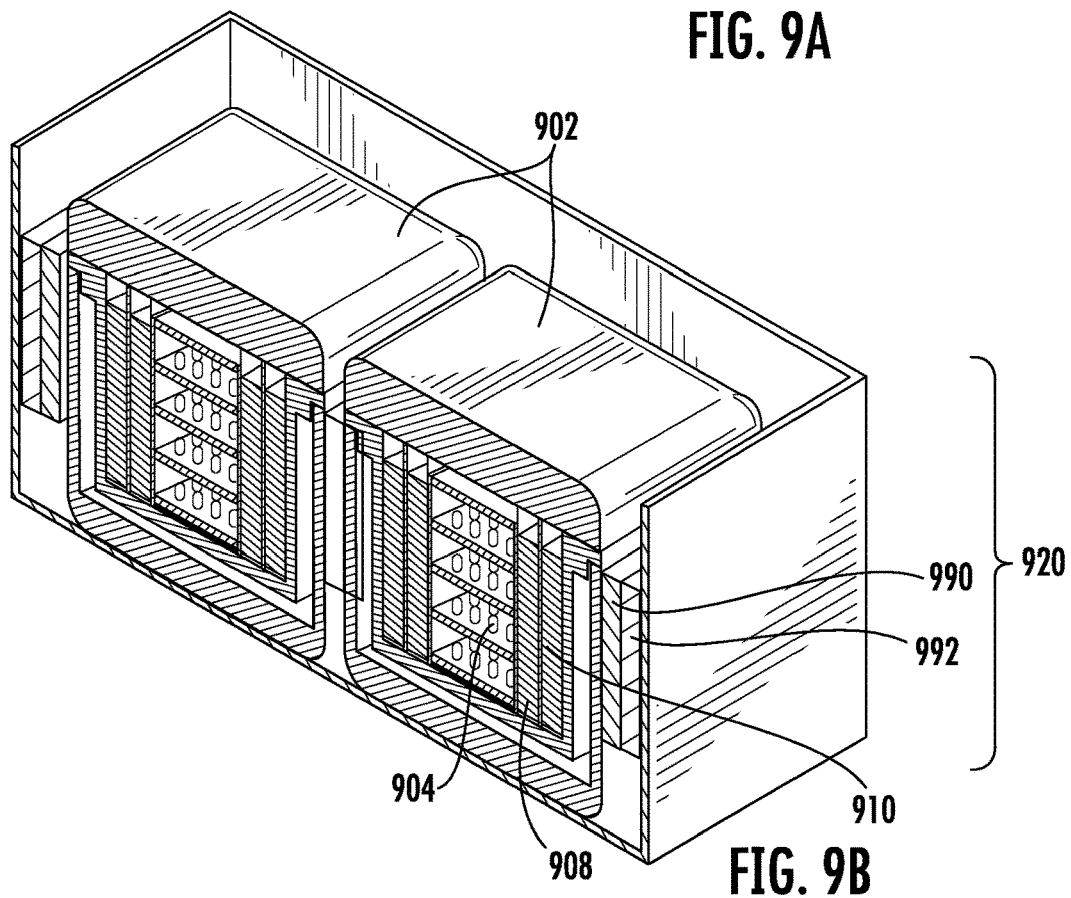
FIG. 9B is a cross-section view of an example embodiment of a plurality of portable storage vessels within an outer storage vessel.

Referring now to FIG. 9A-B. In FIG. 9A a perspective view of an example embodiment of a plurality of portable storage vessels within an outer storage vessel. FIG. 9B is a cross-section view of an example embodiment of a plurality of portable storage vessels within an outer storage vessel. The portable storage vessel 902 is shown as a plurality of portable storage vessels within an outer storage vessel 920. The portable storage vessel 902 has a payload 904 within a central zone of the interior, the central zone having PCM compartments orbiting radially outwards. In this example a first cooling zone 908 is nearest the payload, followed by a second cooling zone 910, and moving radially outwards wherein a third cooling zone 990 and a fourth cooling zone 992 are part of the outer storage vessel 920. Further, the portable vessel 902, and the outer storage vessel 920 are both illustrated with thermally insulating material, and material that mays ever as shock absorption for the payload 904.

In one aspect, methods of storing or transporting a payload are described herein. Methods described herein comprise or include disposing a payload 904 in a portable storage vessel 902. Any portable storage vessel consistent with Section I described herein above can be used. Further, the portable storage vessel 902 may be disposed within an outer storage vessel 920, for additional temperature control and transportation. Methods described herein can further comprise changing a phase of one or more PCMs within the portable storage vessel 902 responsive to an environment external to the portable storage vessel. Further, in some embodiments, methods described herein may comprise disposing the payload 904 in one or a plurality of payload storage vessels. Thus, in some instances, methods comprise disposing a payload storage vessel or plurality of payload storage vessels in a portable storage vessel. Methods described herein can further comprise disposing the portable storage vessel in an outer storage vessel. Methods may optionally further comprise disposing the outer storage vessel in an additional storage vessel.

In some embodiments, methods described herein comprise or include charging the PCM or PCMs prior to disposing the PCM(s) in the portable storage vessel. "Charging" a PCM can comprise lowering a temperature of the PCM to change the phase of the PCM to a first phase, where discharged PCM is a second phase after absorption of thermal energy and subsequent phase change. In some embodiments, the PCMs are charged at the same or substantially the same temperature. In certain other embodiments, individual PCMs are charged at different temperatures. The charging temperatures can be selected based on the phase transition temperatures of the PCM. Further, in some embodiments, methods described herein may comprise disposing at least one "uncharged" PCM into the portable storage vessel. In some such embodiments, an adjacent PCM can charge the "uncharged" PCM prior to or subsequent to addition of the payload. Stated otherwise, one PCM can change the state of an adjacent second PCM to a first phase, and subsequent thermal energy absorption can change the phase of the second PCM to a second phase, thus discharging the PCM.

Further, in some embodiments, as discussed in Section II herein above, a number of uncharged PCMs may be disposed in the portable storage vessel, while a number of charged PCMs are also disposed in the portable storage vessel. For example, a first PCM may be disposed in a first temperature management zone, first cooling zone, and/or within a recess within a first cooling zone in a charged state. In such embodiments, a second PCM may be disposed in a second temperature management zone, second cooling zone, and/or within a recess within a second cooling zone in a discharged or uncharged state. Alternatively, a first PCM may be disposed in a first temperature management zone, first cooling zone, and/or within a recess within a first cooling zone in an uncharged or discharged state, while a second PCM may be disposed in a second temperature management zone, second cooling zone, and/or within a recess within a second cooling zone in a charged state. Any combination of charged and/or uncharged or discharged states can be used not inconsistent with the objectives of the present invention.

Methods described herein can further comprise relocating the portable storage vessel from a first location to a second location. Such methods can comprise relocating the outer storage vessel, where present, from the first location to the second location. However, in some embodiments, the outer storage vessel is not relocated from the first location to the second location and is instead held or maintained at the first location or the second location. Similarly, additional storage vessels, where present, may be stationary at the first location or the second location.

Various implementations of systems and methods have been described in fulfillment of various objectives of the present disclosure. It should be recognized that these implementations are merely illustrative of the principles of the present disclosure. Numerous modifications and adaptations thereof will be readily apparent to those skilled in the art without departing from the spirit and scope of the present disclosure. For example, individual steps of methods described herein can be carried out in any manner not inconsistent with the objectives of the present disclosure, and various configurations or adaptations of systems described herein may be used.

IV. Embodiments

Certain implementations of systems and methods consistent with the present disclosure are provided as follows:

Implementation 1. A system for storing and/or transporting a payload comprising:
a portable storage vessel having an internal cavity, the internal cavity having: a central zone for receiving the payload; a first cooling zone disposed radially outward from the central recess, with a first phase change material disposed in the first cooling zone; a second cooling zone disposed radially outward from the first cooling zone, with a second phase change material disposed in the second cooling zone, wherein the first phase change material has a first phase transition temperature; wherein the second phase change material has a second phase transition temperature; and wherein the second phase transition temperature is between 10° C. and 15° C. higher than the first phase transition temperature; and wherein each of the first phase transition temperature and the second phase transition temperature are below 0° C.

Implementation 2. The system of implementation 1 further comprising at least one first thermal storage cell, individual first thermal storage cells comprising a container having an interior volume and the first phase change material is disposed in the interior volume, with individual first thermal storage cells being disposed in the first cooling zone recesses.

Implementation 3. The system of any of the preceding implementations further comprising at least one second thermal storage cell, individual second thermal storage cells comprising a container having an interior volume and the second phase change material is disposed in the interior volume, with individual second thermal storage cells being disposed in the second cooling zone recesses.

Implementation 4. The system of any of the preceding implementations, wherein: the internal cavity has a third cooling zone disposed radially outward from the second cooling zone, with a third phase change material disposed in the third cooling zone; and the third phase change material having a third phase transition temperature.

Implementation 5. The system of implementation 4, wherein the third phase transition temperature is between 10° C. and 15° C. higher than the second phase transition temperature.

Implementation 6. The system of implementation 4 or 5, wherein the third phase transition temperature is below 0° C.

Implementation 7. The system of any of the preceding implementations, wherein the first phase transition temperature is between −80° C. and −70° C.

Implementation 8. The system of any of the preceding implementations, wherein the first phase change material has a latent heat of between 500 kJ/kg and 600 kJ/kg.

Implementation 9. The system of any of implementations 1-6, wherein the first phase transition temperature is between −75° C. and −55° C.

Implementation 10. The system of any of implementations 1-6 or 9, wherein the first phase change material has a latent heat of between 75 kJ/kg and 225 kJ/kg.

Implementation 11. The system of any of implementations 1-8, wherein the second phase transition temperature is between −75° C. and −55° C.

Implementation 12. The system of any of implementations 1-8 or 11, wherein the second phase change material has a latent heat of between 100 kJ/kg and 225 kJ/kg.

Implementation 13. The system of implementations 4-8 or 11-12, wherein the third phase transition temperature is between −50° C. and −30° C.

Implementation 14. The system of any of implementations 4-8 or 11-13, wherein the third phase change material has a latent heat of between 125 kJ/kg and 275 kJ/kg.

Implementation 15. The system of any of implementations 1-6 or 9-10, wherein the second phase transition temperature is between −50° C. and −30° C.

Implementation 16. The system of any of implementations 1-6, 9-10, or 15, wherein the second phase change material has a latent heat of between 150 kJ/kg and 300 kJ/kg.

Implementation 17. The system of any of implementations 4-6, 9-10, or 15-16, wherein the third phase change temperature is between 25° C. and −10° C.

Implementation 18. The system of any of implementations 4-6, 9-10, or 15-17, wherein the third phase change material has a latent heat of between 200 kJ/kg and 350 kJ/kg.

Implementation 20. The system of any of implementations 4-6, 9-10, or 15-18, wherein the third phase change material is dispersed in a foam.

Implementation 21. The system of implementation 20, wherein the foam comprises a polyurethane foam.

Implementation 22. The system of implementation 20, wherein the foam comprises a polyester foam.

Implementation 23. The system of implementation 20, wherein the foam comprises a polystyrene foam.

Implementation 24. The system of implementation 1, wherein the first phase change material is dry ice.

Implementation 25. The system of implementation 1, wherein the first phase change material is not dry ice.

Implementation 26. The system of any of the preceding implementations, wherein the first phase change material and a fourth phase change material are disposed within the first cooling zone.

Implementation 27. The system of any of the preceding implementations, wherein the second phase change material and a fifth phase change material are disposed within the second cooling zone.

Implementation 28. The system of any of the preceding implementations further comprising an outer storage vessel having at least one recess configured to receive the portable storage vessel.

Implementation 29. The system of implementation 28, wherein the outer storage vessel comprises an insulating material.

Implementation 30. The system of implementation 28 or 29, wherein the outer storage vessel contains at least one phase change material.

Implementation 31. The system of implementation 30, wherein the at least one phase change material of the outer storage vessel has a phase transition temperature of at least 10° C. higher than the second phase transition temperature.

Implementation 32. The system of implementation 30 or 31, wherein the at least one phase change material of the outer storage vessel has a phase transition temperature of at least 10° C. higher than a highest phase transition temperature of a phase change material disposed in the portable storage vessel.

Implementation 33. The system of implementation 30 or 31, wherein the at least one phase change material of the outer storage vessel has a phase transition temperature the same or substantially the same as a highest phase transition temperature of a phase change material disposed in the portable storage vessel.

Implementation 34. The system of any of implementations 30-33, wherein the outer storage vessel contains at least two phase change materials having different phase transition temperatures.

Implementation 35. A method of storing or transporting a payload, the method comprising: disposing the payload in the central zone of the portable storage vessel of any of the preceding claims.

Implementation 36. A system for storing and/or transporting a payload comprising: a portable storage vessel having a plurality of interior recesses, the plurality of interior recesses comprising: a central recess for receiving the payload; a number, n1, of first cooling zone recesses radially outward from the central recess; and a number, n2, of second cooling zone recesses radially outward from the plurality of first cooling zone recesses; a number, n3, of first thermal storage cells, individual first thermal storage cells comprising a container having an interior volume and a first phase change material disposed in the interior volume, with individual first thermal storage cells being disposed in the first cooling zone recesses; and a number, n4, of second thermal storage cells, individual second thermal storage cells comprising a container having an interior volume and a second phase change material disposed in the interior volume, with individual second thermal storage cells being disposed in the second cooling zone recesses, wherein the first phase change material has a first phase transition temperature; wherein the second phase change material has a second phase transition temperature; wherein the second phase transition temperature is between 10° C. and 15° C. higher than the first phase transition temperature; and wherein each of the first phase transition temperature and the second phase transition temperature are below 0° C.

Implementation 37. The system of implementation 36 further comprising a third phase change material having a third phase transition temperature.

Implementation 38. The system of implementation 37, wherein the third phase transition temperature is between 10° C. and 15° C. higher than the second phase transition temperature.

Implementation 39. The system of implementation 37 or 38, wherein the third phase transition temperature is below 0° C.

Implementation 40. The system of any of implementations 36-39, wherein the first phase transition temperature is between −80° C. and −70° C.

Implementation 41. The system of any of implementations 36-40, wherein the first phase change material has a latent heat of between 500 kJ/kg and 600 kJ/kg.

Implementation 42. The system of any of implementations 36-39, wherein the first phase transition temperature is between −75° C. and −55° C.

Implementation 43. The system of any of implementations 36-39 or 42, wherein the first phase change material has a latent heat of between 75 kJ/kg and 225 kJ/kg.

Implementation 44. The system of any of implementations 36-41, wherein the second phase transition temperature is between −75° C. and −55° C.

Implementation 45. The system of any of implementations 36-41 or 44, wherein the second phase change material has a latent heat of between 100 kJ/kg and 250 kJ/kg.

Implementation 46. The system of any of implementations 37-39 or 44-45, wherein the third phase transition temperature is between −50° C. and −30° C.

Implementation 47. The system of any of implementations 37-39 or 44-46, wherein the third phase change material has a latent heat of between 125 kJ/kg and 275 kJ/kg.

Implementation 48. The system of any of implementations 36-39 or 42-43, wherein the second phase transition temperature is between −50° C. and −30° C.

Implementation 49. The system of any of implementations 36-39, 42-43, or 48, wherein the second phase change material has a latent heat of between 150 kJ/kg and 300 kJ/kg.

Implementation 50. The system of any of implementations 37-39, 42-43, or 48-49, wherein the third phase change temperature is between 25° C. and −10° C.

Implementation 51. The system of any of implementations 37-39, 42-43, or 48-50, wherein the third phase change material has a latent heat of between 200 kJ/kg and 350 kJ/kg.

Implementation 52. The system of any of implementations 37-39, 42-43, or 48-50, wherein the third phase change material is dispersed in a foam.

Implementation 53. The system of implementation 52, wherein the foam comprises a polyurethane foam.

Implementation 54. The system of implementation 52, wherein the foam comprises a polyester foam.

Implementation 55. The system of implementation 36, wherein the first phase change material is dry ice.

Implementation 56. The system of implementation 36, wherein the first phase change material is not dry ice.

Implementation 57. The system of any of the preceding implementations, wherein the first phase change material and a fourth phase change material are disposed within the first cooling recesses.

Implementation 58. The system of implementation 57, wherein the first phase change material and the fourth phase change material are both disposed within the interior volume of the same one of the first thermal storage cells.

Implementation 59. The system of implementation 57, wherein the fourth phase change material is disposed in an interior volume of at least one fourth thermal storage cell.

Implementation 60. The system of any of the preceding implementations, wherein the second phase change material and a fifth phase change material are disposed within the second cooling recesses.

Implementation 61. The system of implementation 60, wherein the second phase change material and the fifth phase change material are both disposed within the interior volume of the same one of the second thermal storage cells.

Implementation 62. The system of implementation 60, wherein the fifth phase change material is disposed in an interior volume of at least one fifth thermal storage cell.

Implementation 63. The system of any of implementations 36-62, wherein n1=n3.

Implementation 64. The system of any of implementations 36-62, wherein n1>n3.

Implementation 65. The system of any of implementations 36-64, wherein n2=n4.

Implementation 66. The system of any of implementations 36-64, wherein n2>n4.

Implementation 67. The system of any of implementations 37-66, wherein n5=n6.

Implementation 68. The system of any of implementations 37-66, wherein n5>n6.

Implementation 69. The system of any of implementations 36-68 further comprising an outer storage vessel having at least one recess configured to receive the portable storage vessel.

Implementation 70. The system of implementation 69, wherein the outer storage vessel comprises an insulating material.

Implementation 71. The system of implementation 69 or 70, wherein the outer storage vessel contains at least one phase change material.

Implementation 72. The system of implementation 71, wherein the at least one phase change material of the outer storage vessel has a phase transition temperature at least 10° C. higher than the second phase transition temperature.

Implementation 73. The system of implementations 71 or 72, wherein the at least one phase change material of the outer storage vessel has a phase transition temperature at least 10° C. higher than the third phase transition temperature.

Implementation 74. The system of implementations 71 or 72, wherein the at least one phase change material of the outer storage vessel has a phase transition temperature the same or substantially the same as the third phase transition temperature.

Implementation 75. The system of implementation 74, wherein the at least one phase change material is the same material as the third phase change material.

Implementation 76. The system of any of implementations 69-75, wherein the outer storage vessel contains at least two phase change materials having different phase transition temperatures.

Implementation 77. A method of storing or transporting a payload, the method comprising: disposing the payload in the central recess of the portable storage vessel of any of claims 36-77.

Implementation 78. The method of implementation 35 further comprising:
disposing the first phase change material into the first cooling zone of the portable storage vessel in a solid phase; and disposing the second phase change material into the second cooling zone of the portable storage vessel in a liquid or gel phase.

Implementation 79. The method of implementation 78 further comprising changing the first phase change material from the solid phase to a liquid phase or a gas phase after disposing the first phase change material into the first cooling zone.

Implementation 80. The method of implementation 78 further comprising changing the first phase change material from the solid phase to a liquid phase after disposing the first phase change material into the first cooling zone.

Implementation 81. The method of implementation 78 further comprising changing the first phase change material from the solid phase to a gas phase after disposing the first phase change material into the first cooling zone.

Implementation 82. The method of any of implementations 78-81 further comprising changing the second phase change material from the liquid or gel phase to a solid phase after disposing the second phase change material into the second cooling zone.

Implementation 83. The method of implementation 77 further comprising: disposing the first phase change material into at least one of the first cooling zone recesses of the portable storage vessel in a solid phase; and disposing the second phase change material into the at least one of the second cooling zone recesses of the portable storage vessel in a liquid or gel phase.

Implementation 84. The method of implementation 83 further comprising changing the first phase change material from the solid phase to a liquid phase or a gas phase after disposing the first phase change material into at least one of the first cooling zone recesses.

Implementation 85. The method of implementation 83 further comprising changing the first phase change material from the solid phase to a liquid phase after disposing the first phase change material into at least one of the first cooling zone recesses.

Implementation 86. The method of implementation 83 further comprising changing the first phase change material from the solid phase to a gas phase after disposing the first phase change material into at least one of the first cooling zone recesses.

Implementation 87. The method of any of implementations 83-86 further comprising changing the second phase change material from the liquid or gel phase to a solid phase after disposing the second phase change material into at least one of the second cooling zone recesses.

Implementation 88. A system for storing and/or transporting a payload comprising: a portable storage vessel having an internal cavity, the internal cavity having: a central zone for receiving the payload; a first temperature management zone disposed radially outward from the central recess, with a first phase change material disposed in the first temperature management zone; a second temperature management zone disposed radially outward from the first temperature management zone, with a second phase change material disposed in the second temperature management zone; and a third temperature management zone disposed radially outward from the first temperature management zone, with a third phase change material disposed in the third temperature management zone, wherein the first phase change material has a first phase transition temperature; wherein the second phase change material has a second phase transition temperature; wherein the third phase change material has a third phase transition temperature; and wherein each of the first phase transition temperature, the second phase transition temperature, and the third phase transition temperature are below 0° C.

Implementation 89. The system of implementation 88, wherein: the second phase transition temperature is between 10 and 15° C. lower than the first phase transition temperature; and the third phase transition temperature is between 10 and 15° C. higher than the second phase transition temperature.

Implementation 90. The system of implementation 88, wherein: the second phase transition temperature is between 10 and 15° C. lower than the first phase transition temperature; and the third phase transition temperature is between 20 and 30° C. higher than the second phase transition temperature.

Implementation 91. A method of storing or transporting a payload, the method comprising: disposing the payload in the central recess of the portable storage vessel of any of claims 88-90.

Implementation 92. The method of implementation 91 further comprising: disposing the first phase change material into the first temperature management zone of the portable storage vessel in a solid phase; and disposing the second phase change material into the second temperature management zone of the portable storage vessel in a liquid or gel phase.

Implementation 93. The method of implementation 92 further comprising changing the first phase change material from the solid phase to a liquid phase or a gas phase after disposing the first phase change material into the first temperature management zone.

Implementation 94. The method of implementation 92 further comprising changing the first phase change material from the solid phase to a liquid phase after disposing the first phase change material into the first temperature management zone.

Implementation 95. The method of implementation 92 further comprising changing the first phase change material from the solid phase to a gas phase after disposing the first phase change material into the first temperature management zone.

Implementation 96. The method of any of implementations 92-95 further comprising changing the second phase change material from the liquid or gel phase to a solid phase after disposing the second phase change material into the second temperature management zone.

The invention claimed is:

1. A system for storing and/or transporting a payload comprising:
   a portable storage vessel having an internal cavity, the internal cavity having:
   a central zone for receiving the payload;
   a first cooling zone disposed radially outward from the central zone, with a first phase change material disposed in the first cooling zone;
   a second cooling zone disposed radially outward from the first cooling zone, with a second phase change material disposed in the second cooling zone; and
   a third cooling zone disposed radially outward from the second cooling zone, with a third phase change material disposed in the third cooling zone;
   wherein the first phase change material has a first phase transition temperature;
   wherein the second phase change material has a second phase transition temperature;
   wherein the third phase change material has a third phase transition temperature;
   wherein the second phase transition temperature is between 10° C. and 15° C. higher than the first phase transition temperature;
   wherein the third phase transition temperature is between 10° C. and 15° C. higher than the second phase transition temperature; and
   wherein each of the first phase transition temperature and the second phase transition temperature are below 0° C.

2. The system of claim 1 further comprising at least one first thermal storage cell, individual first thermal storage cells comprising a container having an interior volume and the first phase change material is disposed in the interior volume, with individual first thermal storage cells being disposed in the first cooling zone recesses, and at least one individual second thermal storage cell, the at least one individual second thermal storage cell comprising a container having an interior volume and the second phase change material is disposed in the interior volume, with at least one individual second thermal storage cell being disposed in the second cooling zone recesses.

3. The system of claim 1, wherein the first phase transition temperature is between −80° C. and −70° C., and the first phase change material has a latent heat of between 500 KJ/kg and 600 KJ/kg.

4. The system of claim 1, wherein the third phase change temperature is between −25° C. and −10° C.

5. The system of claim 1, wherein the third phase change material has a latent heat of between 200 KJ/kg and 350 KJ/kg.

6. The system of claim 1, wherein the third phase change material is dispersed in a foam.

7. The system of claim 6, wherein the foam comprises a polyurethane foam, or a polyester foam, or a polystyrene foam.

8. The system of claim 1, wherein the first phase change material is dry ice.

9. The system of claim 1, further comprising an outer storage vessel having at least one recess configured to receive the portable storage vessel.

10. A method of storing or transporting a payload, the method comprising:
    disposing the payload in the central zone of the portable storage vessel of claim 1;
    disposing the first phase change material into the first cooling zone of the portable storage vessel in a solid phase; and
    disposing the second phase change material into the second cooling zone of the portable storage vessel in a liquid or gel phase.

11. A system for storing and/or transporting a payload comprising:
    a portable storage vessel having a plurality of interior recesses, the plurality of interior recesses comprising:
    a central recess for receiving the payload;
    a number, $n_1$, of first cooling zone recesses radially outward from the central recess;
    a number, $n_2$, of second cooling zone recesses radially outward from the plurality of first cooling zone recesses;
    a number, $n_3$, of first thermal storage cells, individual first thermal storage cells comprising a container having an interior volume and a first phase change material disposed in the interior volume, with individual first thermal storage cells being disposed in the first cooling zone recesses; and a number, $n_4$, of second thermal storage cells, individual second thermal storage cells comprising a container having an interior volume and a second phase change material disposed in the interior volume, with individual second thermal storage cells being disposed in the second cooling zone recesses;

wherein the first phase change material has a first phase transition temperature;

wherein the second phase change material has a second phase transition temperature;

wherein the second phase transition temperature is between 10° C. and 15° C. higher than the first phase transition temperature;

wherein each of the first phase transition temperature and the second phase transition temperature are below 0° C.;

wherein the system further comprises a third phase change material having a third phase transition temperature; and wherein the third phase transition temperature is between 10° C. and 15° C. higher than the second phase transition temperature.

12. The system of claim 11, wherein the third phase transition temperature is between −50° C. and −30° C.

13. The system of claim 11, wherein the third phase change material has a latent heat of between 125 kJ/kg and 275 KJ/kg.

14. The system of claim 11, wherein the third phase change material is dispersed in a polyurethane foam, or a polyester foam.

15. The system of claim 11, further comprising an outer storage vessel having at least one recess configured to receive the portable storage vessel.

16. The system of claim 15, wherein the outer storage vessel comprises an insulating material.

17. The system of claim 15, wherein the outer storage vessel contains at least two phase change materials having different phase transition temperatures.

18. A method of storing or transporting a payload, the method comprising:

disposing the payload in the central recess of the portable storage vessel of claim 12;

disposing the first phase change material into at least one of the first cooling zone recesses of the portable storage vessel in a solid phase;

disposing the second phase change material into the at least one of the second cooling zone recesses of the portable storage vessel in a liquid or gel phase;

changing the first phase change material from the solid phase to a liquid phase or a gas phase after disposing the first phase change material into the first cooling zone; and changing the second phase change material from the liquid or gel phase to a solid phase after disposing the second phase change material into the second cooling zone.

* * * * *